(12) United States Patent
Liu et al.

(10) Patent No.: US 7,736,066 B2
(45) Date of Patent: Jun. 15, 2010

(54) THRUST CYLINDRICAL ROLLER BEARING

(75) Inventors: Jun Liu, Fujisawa (JP); Ryosuke Yamada, Fujisawa (JP); Kouji Kobayashi, Fujisawa (JP); Azusa Otani, Fujisawa (JP)

(73) Assignee: NSK Ltd., Tokyo (JP)

( * ) Notice: Subject to any disclaimer, the term of this patent is extended or adjusted under 35 U.S.C. 154(b) by 401 days.

(21) Appl. No.: 11/817,725

(22) PCT Filed: Mar. 2, 2006

(86) PCT No.: PCT/JP2006/304010

§ 371 (c)(1),
(2), (4) Date: Sep. 4, 2007

(87) PCT Pub. No.: WO2006/093235

PCT Pub. Date: Sep. 8, 2006

(65) Prior Publication Data

US 2009/0034897 A1 Feb. 5, 2009

(30) Foreign Application Priority Data

Mar. 3, 2005 (JP) ............................ 2005-059311

(51) Int. Cl.
*F16C 33/46* (2006.01)

(52) U.S. Cl. ....................................... 384/623; 384/619

(58) Field of Classification Search ................ 384/618, 384/619, 621, 623
See application file for complete search history.

(56) References Cited

U.S. PATENT DOCUMENTS 6,106,158 A * 8/2000 Hayashi et al. ............. 384/623

7,637,670 B2 * 12/2009 Oishi .......................... 384/623

FOREIGN PATENT DOCUMENTS

| DE | 1963209 U | 4/1967 |
|---|---|---|
| DE | 1969389 U | 7/1967 |
| DE | 4438957 C1 | 10/1994 |
| DE | 19740435 A1 | 3/1999 |
| DE | 10143089 A1 | 3/2003 |
| JP | 41-1245 B1 | 2/1966 |
| JP | 6-94038 A | 4/1994 |
| JP | 10-196660 A | 7/1998 |
| JP | 11-351245 A | 12/1999 |
| JP | 2000-213546 A | 8/2000 |
| JP | 2002-250347 A | 9/2002 |
| JP | 2003-13975 A | 1/2003 |
| JP | 2003-83333 A | 3/2003 |
| JP | 2003-106336 A | 4/2003 |
| JP | 2004-293700 A | 10/2004 |
| JP | 2004301195 A | 10/2004 |
| JP | 2004-360719 A | 12/2004 |
| JP | 2002-206525 A | 8/2007 |

* cited by examiner

*Primary Examiner*—Thomas R Hannon
(74) *Attorney, Agent, or Firm*—Sughrue Mion, PLLC

(57) ABSTRACT

A diameter dimension of a chamfer 11 which is formed on axial end faces of a cylindrical roller 8 which is retained in each pocket 7 of a cage 2 whose axial positioning is realized by a roller guide at a portion which lies closer to an outside diameter side thereof is made such that a central flat surface 9 which lies on an inside diameter side of the chamfer 11 is not exposed from an external surface of an outside diameter side flat plate portion 14. Then, a difference between a minimum value $\Delta_B$ of an amount by which the cylindrical roller 8 projects from the external surface of the outside diameter side flat plate portion 14 and a dimension $W_{11}$ of the chamfer 11 with respect to a diameter direction thereof is made smaller than a thickness $T_2$ of the cage 2.

10 Claims, 18 Drawing Sheets

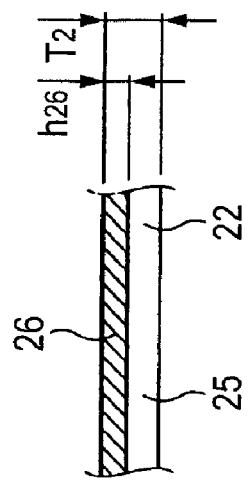
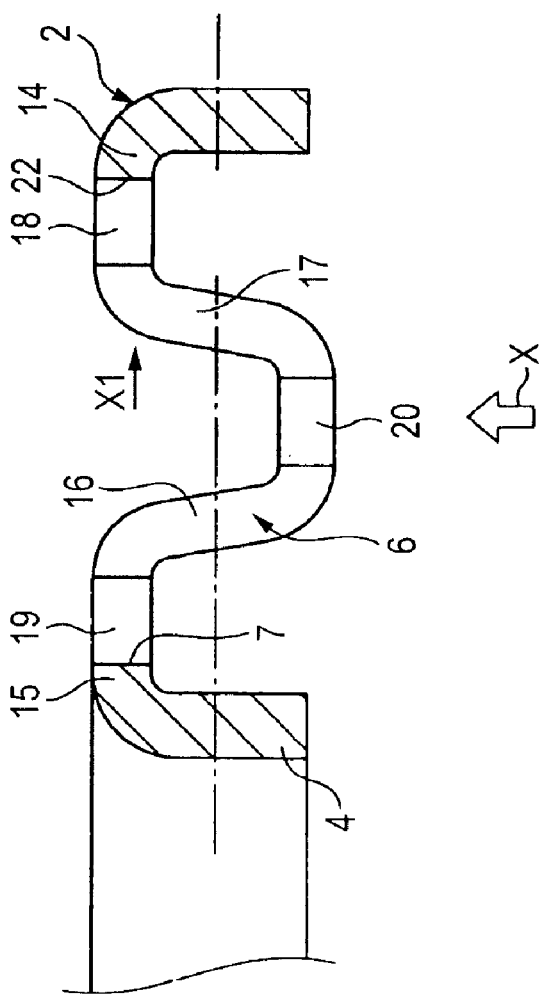

THRUST CYLINDRICAL ROLLER BEARING

TECHNICAL FIELD

The present invention relates to an improvement in thrust cylindrical roller bearings which are built in rotary supporting portions of various types of machines such as automotive transmissions, compressors for automotive air conditioners and machine tools. More particularly, the invention relates to an improvement in thrust cylindrical roller bearings which each include a cage which can be produced at low costs by the application of press-cutting process and bending process to a single sheet of metal, in which a construction having a superior durability is realized by reducing wear of the cage. Note that thrust cylindrical roller bearings to which the invention is applied include thrust needle bearings which use as rolling elements needles (needle-like rollers) whose axial dimension is larger than outside-diameter dimension. Consequently, cylindrical rollers which are described in this specification and claims attached thereto include the needles.

BACKGROUND ART

As thrust cylindrical roller bearings each including a cage which can be produced at low costs by the application of press-cutting process and bending process to a single sheet of metal, techniques described in Patent Document Nos. 1 to 5 are known. FIGS. 15 to 18 show a conventionally constructed thrust cylindrical roller bearing 1 as a first example. This thrust cylindrical roller bearing 1 includes a single cage 2 and a plurality of cylindrical rollers 8, 8. This cage 2 is such as to be produced integrally by bending a metallic plate such as sheet steel and includes a cylindrical inside diameter side rim portion 4, a cylindrical outside diameter side rim portion 5, an intermediate plate portion 6 and a plurality of pockets 7, 7.

Among these, the inside diameter side rim portion 4 is such as to lie in an inner circumferential edge portion of the cage 2 and is formed into an annular shape which continues along the full circumference thereof. In addition, the outside diameter side rim portion 5 is such as to lie in an outer circumferential edge portion of the cage 2 and is formed into an annular shape which is concentric with the inside diameter side rim portion 4 and which continues along the full circumference thereof. In addition, the intermediate plate portion 6 is such as to lie between the inside diameter side rim portion 4 and the outside diameter side rim portion 5 and has a cross section which is bent in the radial direction. Furthermore, the individual pockets 7, 7 are such as to be formed in the intermediate plate portion 6 in such a manner as to be each oriented in a radial direction and arranged intermittently with respect to a circumferential direction of the intermediate plate portion 6, and the cylindrical rollers 8, 8 are individually rotatably held in the pockets 7, 7.

As is shown in FIG. 16, a central flat surface 9 which expands in a direction which is at right angles to a revolution center axis of each of the cylindrical rollers 8, 8 and chamfered portions 11 each having a partially circular coned convex surface shape or a convexly curved surface shape whose cross section is formed into a partially convex arc shape are formed on both axial end faces of each of the cylindrical rollers 8, 8. In the case of the conventional construction, of dimensions of the chamfered portion 11, a dimension $L_8$ in an axial direction of the cylindrical roller 8 and a dimension $W_8$ in a radial direction thereof are made substantially equal ($L_8 \approx W_8$). In addition, portions on the intermediate plate portion 6 which lie between the pockets 7, 7 which are adjacent to each other in the circumferential direction make up pillar portions 12, 12.

In addition, the intermediate plate portion 6 is made up of a central flat plate portion 13, an outer diameter side flat plate portion 14, an inside diameter side flat plate portion 15, an inside diameter side connecting portion 16, and an outside diameter side connecting portion 17. Among these, the central flat plate portion 13 is formed at a portion of the intermediate plate portion 6 which lies radially (horizontally in FIGS. 15, 17, vertically in FIG. 18, and in a direction from near to far side or vice versa in FIG. 19) middle and axially closer to one end (a lower end in FIGS. 15, 17) thereof. In addition, the outside diameter side flat plate portion 14 is formed at a portion of the intermediate plate portion 6 which lies adjacent to a radially inside (a left side in FIG. 17) of the outside diameter side rim portion 5 and axially closer to the other end (an upper end in FIGS. 15, 17) thereof. The outside diameter side and inside diameter side flat plate portions 14, 15 are situated on the same plane. In addition, the inside diameter side connecting portion 16 connects an outer circumferential edge of the inside diameter side flat plate portion 15 with an inner circumferential edge of the central flat plate portion 13, and the outside diameter side connecting portion 17 connects an outer circumferential edge of the central flat plate portion 13 with an inner circumferential edge of the outside diameter side flat plate portion 14. A space between the inside diameter side and outside diameter side connecting portions 16, 17 increases as it goes farther away from the central flat plate portion 13. An external side surface of the central flat plate portion 13 and distal end edges of both the inside diameter side and outside diameter side rim portions 4, 5 are situated on the same plane, or the external side surface of the central flat plate portion 13 projects axially further than the distal end edges.

The cage 2 that is configured as has been described above is disposed between a pair of planes 40a, 41a, axially opposite and parallel to each other, which constitute raceway surfaces of a pair of members which make up the thrust cylindrical roller bearing in such a state that the cylindrical rollers 8, 8 are rotatably held in the pockets 7, 7, individually. Of the central, outside diameter side and inside diameter side flat plate portions 13 to 15 which make up the intermediate plate portion 6, portions which constitute both circumferential side edges of the pillar portions 12, 12 project slightly further inwards into the pockets 7, 7 than both the inside diameter side and outside diameter side connecting portions 16, 17.

Namely, of the outside diameter side flat plate portion which is positioned outwards in a diameter direction and the inside diameter side flat plate portion 15 which is positioned inwards in a diameter direction, portions which constitute circumferential end edge portions of the pillar portions 12, 12 are made to constitute outside diameter side locking portions 18, 18 and inside diameter side locking portions 19, 19, respectively. Then, as is shown in FIGS. 17(a) and 19(a), an axial displacement of the cage 2 to an axial end side (a lower side in FIGS. 17, 19) is controlled by the engagement of the outside diameter side and inside diameter side locking portions 18, 19 with a rolling surface 10 of each cylindrical roller 8 so that part of each cylindrical roller 8 is left projecting axially further than the distal end edges of the central plate portion 13 and both the inside diameter side and outside diameter side rim portions 4, 5.

In addition, of the central flat plate portion 13 which is positioned intermediate in a diameter direction, portions which constitute the circumferential end edge portions of the pillar portions 12, 12 are made to be central locking portions 20, 20, respectively. The, as is shown in FIGS. 17(b) and 19(b), an axial displacement of the cage 2 to the axial end side (an upper side in FIGS. 17, 19) is controlled by the engagement of the central locking portions 20, 20 with the rolling surface 10 of each cylindrical roller 8 so that part of each cylindrical roller 8 is left projecting axially further than both the outside diameter side and inside diameter side flat plate portions 14, 15.

In short, the axial displacement of the cage 2 relative to the cylindrical rollers 8, 8 is suppressed by bringing the respective locking portions 18 to 20 into engagement with the rolling surfaces 10 of the cylindrical rollers 8, 8 in such a state that the cylindrical rollers 8, 8 are held in the pockets 7, 7, respectively. Namely, the positioning of the cage 2 relative to the axial direction is realized by the so-called roller guide.

As the cylindrical rollers 8, 8 which constitute the thrust cylindrical roller bearing that has been described above, as is shown in FIG. 16, which has been described above, more cylindrical rollers in which central portions (portions inwards of chamfered portions which lie closer to an outer circumferential edge) of both axial end faces are made into flat surfaces have come to be used in recent years with a view to securing a load-carrying capacity. Namely, although among cylindrical rollers, there are some cylindrical rollers of which both axial end faces are formed into a partially spherical surface or a convex surface which is made up of a circular cone-shaped surface, in the case of these cylindrical rollers, the axial length (the effective length) of the rolling surface which can bear a load becomes short, and a load that can be borne by the rolling surface becomes small by such an extent. In contrast to this, with the cylindrical rollers 8, 8 in which the central portions of both the axial end faces are made into the flat surfaces, the effective length L (refer to FIG. 16) is secured, the securing of load-carrying capacity of the thrust cylindrical roller bearing 1 in which the cylindrical rollers 8, 8 is facilitated.

Incidentally, when the thrust cylindrical roller bearing that has been described above is in use, a force is exerted on the individual cylindrical rollers 8, 8 which is directed outwardly in a diameter direction. Then, of both the axial end faces of each of the cylindrical rollers 8, 8, the outside diameter side end face 21 which is situated in a diameter direction outer side of the cage 2 is pressed against, of circumferential edge portions of each of the pockets 7, 7, an outside diameter side circumferential edge portion 22 which is situated in the diameter direction outer side of the cage 2. As a result of this, the outside diameter side circumferential edge portion 22 and the outside diameter side end face 21 are caused to rub against each other at a portion shaded with lattice pattern in FIG. 19(a). However, it is not that this outside diameter side end face 21 is pressed against the outside diameter side circumferential edge portion 22 uniformly. In the real world, the outside diameter side end face 21 and the outside diameter side circumferential edge portion 22 are brought into sliding contact in such a state that a portion of the outside diameter side end face 21 which lies closer to the outside diameter side thereof is pressed against the outside diameter side circumferential edge portion 22 due to the cylindrical rollers 8, 8 skewing in the pockets 7, 7.

Namely, while the thrust cylindrical roller bearing 1 is in operation, although it is ideal that the direction of the revolving axis of the cylindrical rollers 8, 8 and the diameter direction of the cage 2 coincide with each other, in the real world, it is not possible to avoid the occurrence of skewing which causes a case where those directions do not coincide with each other. Skewing like this occurs because a frictional coefficient at rolling contact portions between the rolling surfaces 10 of the cylindrical rollers 8, 8 and the raceway surfaces is not uniform relative to a length direction of the rolling contact portions. In addition, an extent to which the outside diameter side end face 21 and the outside diameter side edge portion 22 are brought into offset collision becomes remarkable as a deviation angle (a skew angle) between the two directions increases.

In the event that a boundary portion between an outer circumferential edge portion of the central flat surface 9 and the chamfered portion 11 on the outside diameter side end face 21 and the outside diameter side circumferential edge portion 22 are caused to rub against each other while the cylindrical rollers 8, 8 are skewing, a local concentration of stress occurs at the portion where the rubbing is occurring, and moreover, the boundary portion and the outside diameter side circumferential edge portion 22 are caused to rub against each other at fast rubbing speed. Furthermore, an oil film for lubrication becomes difficult to be formed at this mutual rubbing portion, and a metal contact becomes easy to occur at the mutual rubbing portion. As a result of this, a concavely recessed portion 23, in which the degree of wear becomes remarkable on both sides in the circumferential direction of the cage 2 as is shown in FIG. 20, is formed on the outside diameter side circumferential edge portion 22 in part of the cage 2 which is made of a soft metal compared to a bearing steel of which the cylindrical rollers 8, 8 are made.

When the convexly recessed portion 23 so formed becomes large to some extent, so-called drilling wear occurs in which the chamfered portion 11 which is provided on the outer circumferential edge of part of each of the cylindrical rollers 8, 8 which faces in a diameter direction outer end portion of the cage 2 enters the interior of the concavely recessed portion 23 to thereby be displaced further outwards in the diameter direction of the cage 2 than the position of each of the pockets 7, 7. In the event that drilling wear like this occurs, the sliding resistance of the roller end face relative to the cage is increased, which increases the rotational resistance of the rotary supporting portion in which the thrust cylindrical roller bearing is built, whereby not only the performances of various mechanical apparatuses which have such rotary supporting portions are decreased but also in the event that that the increase in rotational resistance becomes remarkable, it causes a failure such as flaking and seizing. Wear which causes these drawbacks has become easy to occur as the revolution speeds of rotary portions of various mechanical apparatuses such as transmissions and automotive air conditioners are increased by the increase in performance of motor vehicles in these years.

On the other hand, in a case where a cylindrical roller 8a in which both axial end faces are made into a partially spherical convex surface as is shown in FIG. 21 is installed, as is shown in FIG. 22, in a cage 2 which has a similar construction to the conventional construction that has been described heretofore, whether or not skewing occurs, an end edge of an internal surface of an outer diameter side circumferential edge portion 22 of a pocket 7 in the cage 2 and an outside diameter side end face 21a of the cylindrical roller 8a which is formed into the partially spherical convex surface are caused to rub against each other (brought into edge collision with each other), whereby a partially arc-shaped concavely recessed portion 23a shown in FIG. 23 is formed in a central portion of the outside diameter side circumferential edge portion 22. Then, when this concavely recessed portion 23a becomes large, a problem like the one described above is also caused.

A construction described in Patent Document No. 5 has conventionally been known as a construction which reduces the drawback that has been described above. FIG. 24 shows a related art construction which follows an invention described in Patent Document No. 5. In the case of this related art construction, a pocket 7a in a cage 2 is formed to such an extent that it reaches a proximal portion of an outside diameter side rim portion 5a. In addition, a cylindrical roller 8, in which both axial end faces are formed into a partially spherical convex surface is retained within the pocket 7a, and the outside diameter side end face 21a of the cylindrical roller 8a is made to face an inner circumferential surface of the outside diameter side rim portion 5a. In the case of the related art construction which is constructed as has been described above, even in the event that both the surfaces are caused to rub against each other, since a diameter of the mutual rubbing portion is made small to thereby suppress the rubbing speed V to an extremely low level, the wear of the mutual rubbing portion is suppressed. In the case of the related art construction described in the cited document No. 5, since the cylindrical roller 8a in which the axial end faces are formed into the convex surface needs to be used, of this cylindrical roller 8a, the axial length L a of the rolling surface which can bear the load becomes short, and the load that can be borne becomes small by such an extent.

Patent Document No. 1: JP-A-6-94038
Patent Document No. 2: JP-A-2000-213546
Patent Document No. 3: JP-A-2002-206525
Patent Document No. 4: JP-A-11-351245
Patent Document No. 5: JP-A-2003-83333

DISCLOSURE OF THE INVENTION

Problems to be Solved by the Invention

The invention is made in view of the situations described heretofore with a view to realizing a cylindrical roller bearing which facilitates a design for securing a load-carrying capacity, which facilitates the installation of cylindrical rollers into pockets in a cage, and moreover, which suppress the wear of an outside diameter side circumferential edge portion of the pockets provided in the cage.

Means for Solving the Problems

A thrust cylindrical roller bearing of the invention includes, as with the conventionally known thrust cylindrical roller bearing that has been described above, a cage and a plurality of cylindrical rollers.

Of these, the cage is made into a circular ring shape as a whole and includes a plurality of pockets at a plurality of locations in a circumferential direction thereof, each pocket being disposed in a radial direction.

In addition, the cage is made integrally by bending a metal plate and includes an inside diameter side rim portion, an outer diameter side rim portion, an intermediate plate portion, the pockets, and a plurality of pillar portions.

Of these, the inside diameter side rim portion lies in an inner circumferential portion and is formed into an annular shape which continues along a full circumference thereof, and the outside diameter side rim portion lies in an outer circumferential edge portion and is formed into an annular shape which is concentric with the inside diameter side rim portion and which continues along the full circumference thereof.

In addition, the intermediate plate portion lies between the outside diameter side rim portion and the inside diameter side rim portion, is bent with respect to a diameter direction in cross section and is made up of a central flat plate portion, an outside diameter side flat plate portion, an inside diameter side flat plate portion, an inside diameter side connecting portion and an outside diameter side connecting portion.

Of these, the central plate portion is formed at a portion which lies intermediate in a diameter direction and axially closer to one end.

In addition, the outside diameter side flat plate portion is formed at a portion which lies adjacent to a diameter inner side of the outside diameter side rim portion and axially closer to the other end.

Additionally, the inside diameter side flat plate portion is formed at a portion which lies adjacent to a diameter outer side of the inside diameter side rim portion and axially closer to the other end.

In addition, the inside diameter side connecting portion connects an outer circumferential edge of the inside diameter side flat plate portion with an inner circumferential edge of the central flat plate portion, and the outside diameter side connecting portion connects an outer circumferential edge of the central plate portion with an inner circumferential edge portion of the outside diameter side flat plate portion.

Additionally, the pockets are each a rectangular hole which is elongated in a diameter direction of the intermediate plate portion, are formed in the intermediate plate portion intermittently with respect to a circumferential direction and individually in a radial direction.

In addition, the cylindrical rollers are rotatably retained in the pockets of the cage.

In addition, as with the conventionally known thrust cylindrical roller bearings that has been described above, the cylindrical roller bearing controls an axial displacement of the cage to the one axial end side by the engagement of each outside diameter side locking portion and each inside diameter side locking portion which are provided on a circumferential end edge of each pillar portion at portions of the outside diameter side flat plate portion and the inside diameter side flat plate portion with a rolling surface of each cylindrical roller in such a state that part of each cylindrical roller is left projecting axially further than distal end edges of both the inside diameter side and outside diameter side rim portions and the central flat plate portion.

In addition, an axial displacement of the cage to the other axial end is controlled by the engagement of each central locking portion which is provided on the circumferential end edge of the pillar portion at a portion of the central flat plate portion with the rolling surface of the cylindrical roller in such a state that part of the cylindrical roller is left projecting axially further than the outside diameter of side flat plate portion and the inside diameter side flat plate portion.

In particular, in the thrust cylindrical roller bearing of the first invention, any of the cylindrical rollers includes, on at least an end face of both axial end faces thereof which lies on an outside diameter side of the cage, a central flat surface which expands in a direction which is at right angles to a revolution center axis of the cylindrical roller and a chamfered portion which connects an outer circumferential edge of the central flat surface with the rolling surface along a full circumference thereof.

In addition, in such a state that the cage is displaced to the one axial end side so that the outside diameter side locking portion and the inside diameter side locking portion are brought into engagement with the rolling surface of the cylindrical roller, an amount by which part of the cylindrical roller projects from external surfaces of both the outside diameter side and inside diameter side flat plate portions which make up the cage is made to be less than a dimension of the chamfered portion with respect to the diameter direction of the cylindrical roller. Along with this, in such a state that the cage is displaced to the other axial end side so that the central locking portion is brought into engagement with the rolling surface of the cylindrical roller, a difference between an amount by which part of the cylindrical roller projects from the external surface of the outside diameter side flat plate portion which makes up the cage and the dimension of the chamfered portion relative to the diameter direction of the cylindrical roller is made to be smaller than the thickness of the metal plate.

According to the first invention that is configured as has been described above, a thrust cylindrical roller bearing can be realized which facilitates a design for securing a load-carrying capacity, moreover, suppresses wear of the outside diameter side circumferential edge portion of each pocket provided in the case, and prevents the drilling wear of an outside diameter side end portion of each cylindrical roller under one surface of the cage at a portion lying closer to an outside diameter side thereof which drilling wear would otherwise by caused by the wear.

Namely, a rubbing portion between the outside diameter side circumferential edge portion of each pocket and the outside diameter side end face of each cylindrical roller held in the pocket is made to fall within a range which is narrower than the relate art example, and this rubbing portion can be positioned closer to the center of the pocket in the circumferential direction thereof. Because of this, a local concentration of stress is made difficult to be caused at this rubbing portion by the offset collision attributed to the skewing of the roller, and furthermore, the sliding speed V at this rubbing portion can be suppressed to a low level. As a result of this, it is possible to prevent the formation of a concavely recessed portion 23 as shown in FIG. 20 at the outside diameter side circumferential edge portion by wear.

In addition, since as the cylindrical roller, the cylindrical roller is used which includes the central flat surface which expands in the direction which is at right angles to the revolution center axis of the cylindrical roller on at least the axial end face of both the axial end faces which lies on the outside diameter side of the cage, the designing of the cylindrical roller to have a longer effective length with a view to securing the load-carrying capacity of the thrust cylindrical roller bearing is facilitated.

Furthermore, since the axial positioning of the cage is realized by the engagement of the individual locking portions formed in each pocket with the rolling surface of each cylindrical roller, axial sides of the cage is caused to rub against the mating raceway surfaces in no case. Because of this, the scraping of lubricating oil adhering to the raceway surfaces by the cage is prevented, thereby making it possible to lubricate well contact portions between the raceway surfaces and the rolling surfaces of the cylindrical rollers.

In addition, when carrying out the first invention, as a second invention, in such a state that the cage is displaced to the one axial end side so as to bring the outside diameter side locking portions and the inside diameter side locking portions into engagement with the rolling surface of each cylindrical roller, the length of a surface over which the central flat surface of the cylindrical roller rubs against the outside diameter side circumferential edge portion of each pocket is preferably suppressed so as to fall within 80% of the diameter of the cylindrical roller.

According to the configuration like this, the local concentration of stress at the mutual rubbing portion is made more difficult to be produced, and the sliding speed V at this mutual rubbing portion can be decreased further. As a result of this, the formation of a concavely recessed portion 23 as shown in FIG. 20 at the outside diameter side circumferential portion by wear can be prevented more effectively.

In addition, when carrying out the first or second invention, as a third invention, of dimensions of the chamfered portion of each cylindrical roller, a dimension in the axial direction of the cylindrical roller is preferably made larger than a dimension in the diameter direction thereof.

According to the configuration like this, the design of the cylindrical roller to have a longer effective length with a view to securing the load-carrying capacity of the thrust cylindrical roller bearing is enabled.

In addition, when carrying out the first to third inventions, as a fourth invention, a difference between an amount by which part of each cylindrical roller projects from the external surfaces of both the outside diameter side and inside diameter side flat plate portions which make up the case in such a state that the cage is displaced to the one axial end side so as to bring the outside diameter side locking portions and the inside diameter side locking portions into engagement with the rolling surface of each cylindrical roller and an amount by which part of each cylindrical roller projects from the external surfaces of both the flat plate portions in such a state that the cage is displaced to the other axial end side so as to bring the central locking portions with the rolling surface of the cylindrical roller, that is, an amount of looseness of the cage with respect to the axial direction thereof relative to the cylindrical roller is preferably made to be equal to or more than 50 μm.

In the event that the looseness amount of 50 μm is secured while satisfying the condition described above to realize the positioning of the cage with respect to the axial direction by the roller guide, a sufficient gap can be secured between the rolling surface of the cylindrical roller and both the circumferential side edges of each pillar portion which makes up the cage. Because of this, the scraping of lubricating oil which adheres to the rolling surface of the cylindrical roller by both the circumferential side edges of the pillar portion can be prevented, so as to supply sufficient lubricating oil to rolling contact portions between the rolling surface of the cylindrical roller and the mating raceway surfaces. In addition, a sufficient oil film can be formed at each of the rolling contact portions, so as to realize the securing of the rolling fatigue life of the rolling surface of the cylindrical roller and the mating raceway surfaces.

Furthermore, when carrying out the first to fourth inventions, as a fifth invention, with a pair of members having raceway surfaces which are brought into rolling contact with the rolling surface of each of the cylindrical rollers both made to revolve when in use, the central flat plate portion of the cage is preferably made to face the member whose revolution speed when in use is faster.

By adopting the configuration like this, more lubricating oil can be fed into the mutual rubbing portion between the outside diameter side end face of the cylindrical roller and the outside diameter side circumferential edge portion of the cage, whereby the occurrence of metal contact at the rubbing portion can be made difficult.

In addition, when carrying out the first to fifth inventions, as a sixth invention, a shear surface is formed on the outside diameter side circumferential edge portion of the pocket at a portion which lies closer to the revolution center axis of each cylindrical roller, and the central flat surface of each cylindrical roller is preferably brought into contact with only the shear surface while the bearing is in revolution.

By adopting the configuration like this, since the central flat surface of each cylindrical roller is brought into contact with only the shear surface on the outside diameter side circumferential portion of the pocket while the bearing is in revolution, the surface roughness of the outside diameter side circumferential edge portion of the pocket which is brought into contact with each cylindrical roller is improved, whereby the looseness amount (the axial moving amount) of each cylindrical roller is reduced, and the occurrence of skewing is suppressed, a sufficient oil film for lubrication being formed on the rubbing surface. As a result of this, the drilling wear of the outside diameter side end portion of each cylindrical roller under the one surface of the cage which lies closer to the outside diameter side thereof can be prevented more effectively.

In addition, in a thrust cylindrical roller bearing of a seventh invention, an amount by which part of each of the cylindrical rollers projects axially further than the outside diameter side flat plate portion and the inside diameter side flat plate portion in such a state that the cage is displaced to the one axial end side so as to bring the outside diameter side locking portions and the inside diameter side locking portions into engagement with the rolling surface of the cylindrical roller is made smaller than an amount by which part of the cylindrical roller projects axially further than the central flat plate portion in such a state that the cage is displaced to the other axial end side so as to bring the central locking portions with the rolling surface of the cylindrical roller.

Because of this, for example, a space between distal end edges of a pair of outside diameter side locking portions, a space between distal end edges of a pair of central locking portions and a space between distal end edges of a pair of inside diameter side locking portion portions are controlled properly, the pairs of outside diameter side locking portions, central locking portions and inside diameter side locking portions being provided on both the circumferential end edge portions of each of the pockets, respectively, in such a manner as to face each other. To be specific, the space between the distal end edges of both the outside diameter side locking portions and the space between the distal end edges of both the inside diameter side locking portions are made equal to each other, and the space between the distal end edges of the central locking portions is made wider than those spaces.

However, in the event that the projecting amounts of the cylindrical roller from the respective flat plate portions can be controlled without controlling the spaces between the respective distal end edges of the locking portions to the aforesaid relationships due to sagging produced at both the circumferential end edge portions of each pocket in association with pressing process (press-cutting process), the spaces do not necessarily have to be controlled to the relationships.

According to the seventh invention that is configured as has been described above, a thrust cylindrical roller bearing can be realized which facilitates the design to secure the load-carrying capacity thereof, facilitates the installation of the cylindrical rollers into the pockets in the cage and suppress wear of the outside diameter side circumferential edge portions of the pockets provided in the cage.

Namely, for example, since the projecting amount of each cylindrical roller from both the outside diameter side and inside diameter side flat plate portions is made small by making relatively narrow (sufficiently small compared to the diameter of each cylindrical roller) the space between the distal end edges of both the outside diameter side locking portions and the space between the distal end edges of both the inside diameter side locking portions which distal end edges of the outside diameter side and inside diameter side locking portions are made to brought into engagement, respectively, with both end portions of each cylindrical roller with respect to the axial direction (of the cylindrical roller itself), the displacement amount of each cylindrical roller with respect to the circumferential direction of the cage is suppressed to a low level. Consequently, the skew angle of each cylindrical roller is suppressed to a small angle, whereby the degree of occurrence of offset collision between the outside diameter side end face of the cylindrical roller and the outside diameter side circumferential edge portion of the pocket is suppressed to a low level. Because of this, the degree of occurrence of stress concentration at a mutual rubbing portion between the outside diameter side end face and the outside diameter side circumferential edge portion is suppressed to a low level. Furthermore, the formation of an oil film for lubrication at the mutual rubbing portion is facilitated, thereby making it possible to prevent the occurrence of metal contact at this mutual rubbing portion. As a result of this, the formation of a concavely recessed portion 23 as is shown in FIG. 20 at the outside diameter side circumferential edge portion by wear can be prevented.

On the other hand, although no direct effect is imposed on the suppression of skewing of the cylindrical roller, the space between the distal end edges of both the central locking portions are relatively large (smaller by a slight amount than the diameter of each cylindrical roller) which are provided at the middle portion in a diameter direction of each pocket on the opposite side of both the outside diameter side locking portions and both the inside diameter side locking portions with respect to the axial direction (of the cage). Consequently, the work of installing each cylindrical roller into each pocket can be implemented with ease by elastically expanding the space between the distal end edges of both the central locking portions. In short, the work of installing each cylindrical roller into each pocket is made in no case difficult by narrowing the space between both the outside diameter side locking portions and the space between both the inside diameter side locking portions with a view to preventing the skewing of the cylindrical roller.

In addition, in the case of this invention, there is no specific limitation on the configuration of the outside diameter side end face of each cylindrical roller because the wear of the outside diameter side circumferential edge portion of each pocket is prevented by suppressing the skewing of each cylindrical roller. Consequently, the design of each cylindrical roller to have a long effective length with a view to securing the load-carrying capacity of the thrust cylindrical roller bearing becomes easy.

Furthermore, in the case of this invention, since the axial positioning of the cage is realized by the engagement of the respective locking portions which are provided on each pocket with the rolling surface of each cylindrical roller, there occurs no case where both the axial side surfaces of the cage are caused to rub against the mating raceway surfaces. Because of this, the scraping of lubricating oil which adheres to the raceway surfaces by the cage can be prevented, thereby making it possible to lubricate well the rolling contact portion between the raceway surfaces and the rolling surface of the cylindrical roller.

When carrying out the seventh invention, as an eighth invention, an amount by which part of each cylindrical roller projects axially further than the outside diameter side flat plate portion and the inside diameter side flat plate portion in such a state that the cage is displaced to the one axial end side so as to bring the respective outside diameter side locking portions and the respective inside diameter side locking portions into engagement with the rolling surface of each cylindrical roller is made to be preferably 80% or less and more preferably 70% or less of an amount by which part of each cylindrical roller projects axially further than the central flat plate portion in such a state that the cage is displaced to the other axial end side so as to bring the respective central locking portions into engagement with the rolling surface of each cylindrical roller.

As long as a maximum projecting amount from the outside diameter side flat plate portion and the inside diameter side flat plate portion is made smaller than a maximum projecting amount from the central flat plate portion, when compared to a case where both the maximum projecting amounts are made the same or the relationship of both the maximum projecting amounts is reversed, the function and advantage can be obtained that the skew angle is suppressed while facilitating the work of installing each cylindrical roller into each pocket. However, with a difference between the maximum projecting amounts be to such an extent that the maximum projecting amount from the outside diameter side flat plate portion and the inside diameter side flat plate portion is made smaller only by an extremely small amount than the maximum projecting amount from the central flat plate portion, a function and advantage that can be obtained is limited. In contrast to this, in the event that the difference between both the maximum projecting amounts is made to be the extent described in the seventh invention, the function and advantage described above can be obtained sufficiently.

Note that a maximum value of the difference (ratio) between both the maximum projecting amounts will be controlled in the following manner. Namely, with a maximum projecting amount from the central flat plate portion realized in such a state that the cage is displaced to the axial other end side so as to bring the respective central locking portions into engagement with the rolling surface of each cylindrical roller, a projecting amount (a minimum projecting amount) of each cylindrical roller from the outside diameter side flat plate portion and the inside diameter side flat plate portion is secured to such an extent that this minimum projecting amount becomes clearly a positive value. In this case, the clear positive value means a value by which the minimum projecting amount is allowed to secure a clearance between the surfaces of the outside diameter side flat plate portion and the inside diameter side flat plate portion and the mating raceway surfaces without causing both the surfaces to rub against each other. The maximum projecting amount from the outside diameter side flat plate portion and the inside diameter side flat plate portion is, of course, a value which is larger than the minimum projecting amount. On the other hand, the maximum projecting amount from the central flat plate portion is controlled to such an extent that the fall of each cylindrical roller from the inside of each pocket can be prevented with the space between the distal end edges of the pair of central locking portions made to be less than the diameter of each cylindrical roller. With these facts taken into consideration, in the case of such a general thrust cylindrical roller bearing as is built in an automotive transmission or a compressor for an automotive air conditioner, a maximum value of a difference (ratio) that is provided between both the maximum projecting amounts is made to be preferably 4 or less and more preferably 3 or less.

In addition, when carrying out the seventh invention or the eighth invention, as a ninth invention, as each of the cylindrical rollers, a cylindrical roller is preferably used in which a central portion of each of end faces in an axial direction (of each cylindrical roller itself) is made to constitute a central flat surface which lies in a direction which is at right angles to the revolution center axis of each cylindrical roller.

In the event that the cylindrical roller configured like this is used, the effective length of each cylindrical roller can be extended, so as to realize the securing of the load-carrying capacity of the thrust cylindrical roller bearing.

In addition, when carrying out the seventh to ninth inventions, as a tenth invention, with a pair of members having raceway surfaces which are brought into rolling contact with the rolling surface of each of the cylindrical rollers both made to revolve when in use, the central flat plate portion of the cage is preferably made to face the member whose revolution speed when in use is faster.

By adopting the configuration like this, lubricating oil can be fed with good efficiency into a rolling contact portion, which requires much lubricating oil, between the raceway surfaces which revolve at high speeds and the rolling surface of each of the cylindrical rollers.

ADVANTAGE OF THE INVENTION

According to the invention that is configured as has been described above, the thrust cylindrical roller bearing can be realized which facilitates the design to secure load-carrying capacity, facilitates the installation of the cylindrical rollers into the pockets in the cage, and moreover, suppresses the wear of the outside diameter side circumferential edge portions of the pockets provided in the cage.

BRIEF DESCRIPTION OF THE DRAWINGS

FIG. 1

To describe Embodiment 1 of the invention.

To show the configuration of a pocket in the cage, FIG. 2 is a diagram showing a state resulting when the pocket is viewed from an axial direction of the cage.

FIG. 3(a) shows qv values in a contact position between an outside diameter side end face of the cylindrical roller and an outside diameter side circumferential edge portion of the pocket of Embodiment 1, and FIG. 3(b) shows qv values of a related art example.

To describe Embodiment 2 of the invention, FIG. 4 is a diagram similar to FIG. 7 which shows a frictional state between the outside diameter side end face of a cylindrical roller and an outside diameter side circumferential edge portion of a pocket and a worn state of the outside diameter side circumferential edge portion of the pocket.

FIG. 5 is a side view of a cylindrical roller that is to be installed in Embodiment 3 of the invention.

FIG. 6 is a partial sectional view showing a thrust cylindrical roller bearing of Embodiment 3 which is made by installing the cylindrical roller in a cage thereof in such a state that the roller bearing is taken on an imaginary plane which contains a center axis of the cage.

FIG. 7 is a sectional view taken along the line VII-VII in FIG. 6, which shows a frictional state between an outer diameter side end face of the cylindrical roller and an outside diameter side circumferential edge portion of a pocket of Embodiment 3 and a worn state of the outside diameter side circumferential edge portion of the pocket.

To describe a preferable axial displacement amount of a cage relative to a cylindrical roller, FIGS. 8(a) and 8(b) are partial sectional views showing the cage that is moved to both axial end portions and a trust cylindrical roller bearing in such a state that the roller bearing is taken on an imaginary plane which contains a center axis of the cage.

To describe Embodiment 5, FIG. 9(a) is a sectional view, corresponding to FIG. 1(b), which shows a thrust cylindrical roller bearing in such a state that the roller bearing is taken on an imaginary plane which contains a center axis of a cage in such a case where the cage is displaced to one axial end side relative to a cylindrical roller, and FIG. 9(b) is a sectional view, corresponding to FIG. 1(d), which shows the thrust cylindrical roller bearing in such a state that the roller bearing is taken on the imaginary plane which contains the center axis of the cage in such a case where the cage is displaced to the other axial end side relative to the cylindrical roller.

FIG. 10(a) is a diagram showing a process of press-cutting a cage from sheet steel, and FIG. 10(b) is a diagram showing the configuration of a cut surface of the sheet steel and a surface configuration distribution.

FIG. 11

FIG. 11(a) is a diagram showing a press-cutting direction when press-cutting the sheet steel, and FIG. 11 (b) is a diagram showing a surface configuration of an outside diameter side circumferential edge portion of a pocket when viewed from a direction indicated by an arrow XI in FIG. 11(a).

FIGS. 12(a) and 12(b) are partial sectional views showing Embodiment 6 of the invention, in which FIG. 12 (a) shows a state in which a cage has been displaced to one axial end side relative to a cylindrical roller and FIG. 12(b) shows a state in which the cage has been displaced to the other axial end side in the similar fashion.

FIG. 13(a) is a sectional view taken along the line XIII-XIII in FIG. 12(a), and FIG. 13(b) is a sectional view taken along the line XIII"-XIII∝ in FIG. 12(b).

FIG. 14 is a diagram showing the configuration of a pocket resulting when viewed from an axial direction of a cage.

FIG. 15 is a diagram, similar to FIG. 6, which shows an example of a general thrust cylindrical roller bearing.

FIG. 16 is a side view showing a cylindrical roller that is removed therefrom.

FIGS. 17(a) and 17(b) are partial sectional views showing a state in which a cage is displaced to one axial end side shown in FIG. 17 (a) relative to the cylindrical roller and a state in which the cage is displaced to the other axial end side shown in FIG. 17(b), with the thrust cylindrical roller bearing shown in such a state that the roller bearing is taken on an imaginary plane which contains a center axis of the cage.

To describe the configuration of a pocket in the cage. FIG. 18 is a diagram showing a state that the pocket is seen from a center axis direction of the cage.

FIGS. 19(a) and 19(b) are sectional views, similar to FIG. 1(b), which describe a drawback that is produced when dimensions of a chamfered portion on an axial end face of the cylindrical roller are improper.

FIG. 20 is a diagram, similar to FIG. 3(b), which shows a state in which an outside diameter side circumferential edge portion of the pocket in the cage gets worn.

FIG. 21 is a side view showing a cylindrical roller whose axial end faces are formed into a spherically convex surface.

FIG. 22 is a partial sectional view showing a state in which a first example of a thrust cylindrical roller bearing in which the cylindrical roller is built is taken on an imaginary plane which contains a center axis of a cage.

FIG. 23 is a diagram of a pocket as viewed from a center axis direction of the cage which shows a worn state of an outside diameter side circumferential edge portion of the pocket which is caused in the thrust cylindrical roller bearing in which the cylindrical roller is built whose axial end faces are formed into the convex surface.

FIG. 24 is a partial sectional view showing a state in which a second example of a thrust cylindrical roller bearing in which the cylindrical roller whose axial end faces are formed into the convex surface is built is taken on an imaginary plane which contains a center axis of a cage.

Figure 1B:
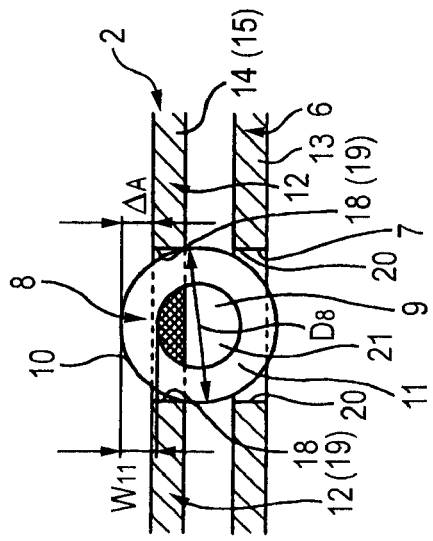
FIG. 1(b) is a sectional view taken along the line I-I in FIG. 1(a)

DESCRIPTION OF REFERENCE NUMERALS 1 thrust cylindrical roller bearing; 2 cage; 4 inside diameter side rim portion; 5, 5a outside diameter side rim portion; 6 intermediate plate portion; 7, 7a pocket; 8, 8a, 8b cylindrical roller; 9, 9a central flat surface; 10 rolling surface; 11, 11a chamfered portion; 12 pillar portion; 13 central flat plate portion; 14 outside diameter side flat plate portion; 15 inside diameter side flat plate portion; 16, 16a inside diameter side connecting portion; 17, 17a outside diameter side connecting portion; 18, 18a outside diameter side locking portion; 19, 19a inside diameter side locking portion; 20, 20a central locking portion; 21, 21a, 21b outside diameter side end face; 22, 22a outside diameter side circumferential edge portion; 23, 23a concavely recessed portion; 24 mutual rubbing surface

BEST MODE FOR CARRYING OUT THE INVENTION

Embodiment 1

Figure 1A:
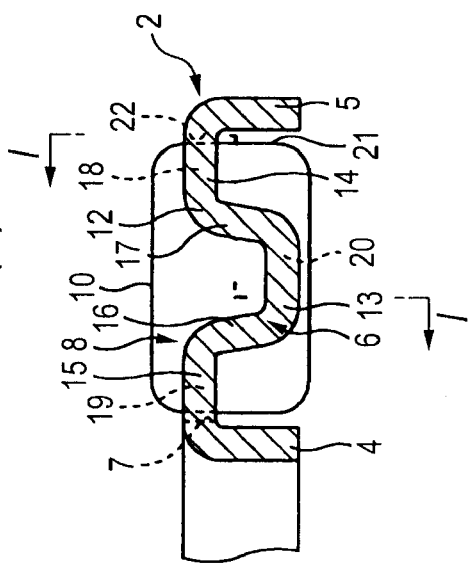
FIG. 1(a) is a partial sectional view showing a thrust cylindrical roller bearing in such a state that the roller bearing is taken on an imaginary plane which contains a center axis of a cage, with the cage displaced to one axial end side relative to a cylindrical roller.
Figure 1D:
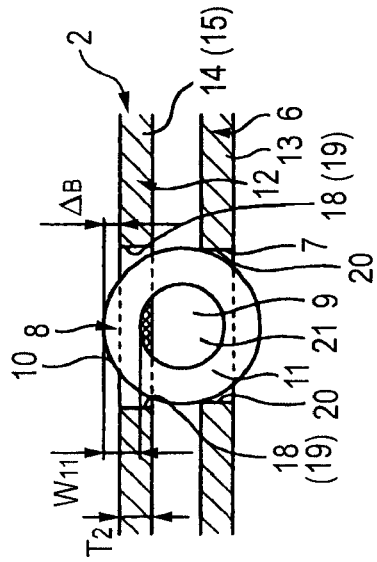
FIG. 1(d) is a sectional view taken along the line I'-I' in FIG. 1(c).
Figure 1C:
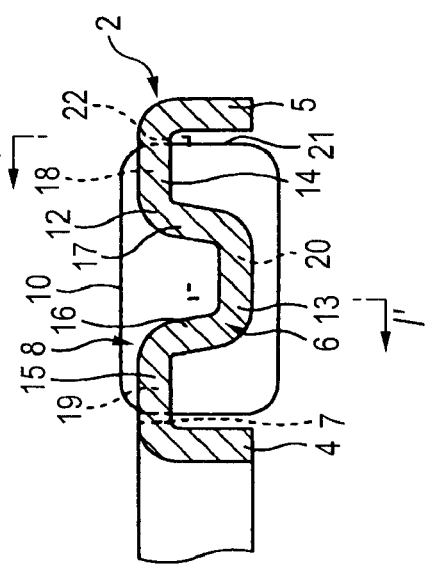
FIG. 1(c) is a partial sectional view showing the thrust cylindrical roller bearing in such a state that the roller bearing is taken on the imaginary plane which contains the center axis of the cage, with the cage displaced to the other axial end side relative to the cylindrical roller.
Figure 2:
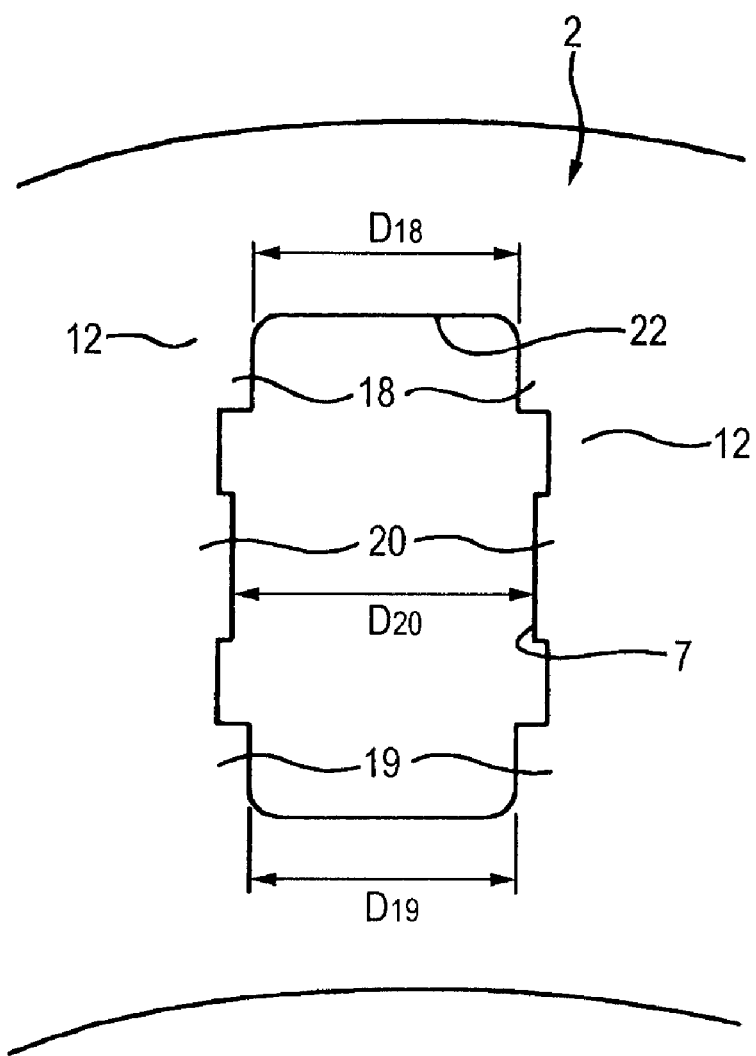
FIG. 2

FIGS. 1 to 2 show Embodiment 1 of the invention which corresponds to the first and fifth inventions. Note that a feature of this embodiment resides in a fact that even though a cylindrical roller in which a central flat surface 9 is provided at a central portion of axial end faces thereof is used as each of cylindrical rollers 8, the occurrence of wear such as leads to the concavely recessed portion 23 shown in FIG. 20 described above at an outside diameter side circumferential edge portion 22 of each of a plurality of pockets 7 provided in a radial direction in an intermediate plate portion 6 which makes up a cage 2 is prevented by controlling the movement of each cylindrical roller 8 within each pocket 7 in relation to a diameter dimension (the diameter of the central flat surface 9 formed at the central portion) of chamfered portions 11 which are formed at portions on both the axial end faces of each cylindrical roller 8 which lie closer to an outside diameter side thereof. Since the configuration and function of the other portions are similar to those of the related art construction shown in FIGS. 15 to 18 described above, the repetition of similar illustrations and descriptions will be omitted or they will be briefly made, so that characteristic parts of the embodiment will mainly be described below.

In the case of this embodiment, as is shown in FIGS. 1(a) and (b), an amount $\Delta_A$ by which part of the cylindrical roller 8 projects from external surfaces of both outside diameter side and inside diameter side flat plate portions 14, 15 which make up the cage 2 in such a state that the cage 2 is displaced to one axial end side (a lower side in FIG. 1) relative to the cylindrical roller 8 so as to bring individual outside diameter side locking portions 18, 18 and individual inside diameter side locking portions 19, 19 with a rolling surface 10 of the cylindrical roller 8 is made to be less than a dimension $W_{11}$ of the chamfered portion 11 with respect to a diameter direction of the cylindrical roller 8 ($\Delta_A < W_{11}$). Consequently, in such a state that the outside diameter side and inside diameter side locking portions 18, 19 are brought into engagement with the rolling surface 10 of the cylindrical roller 8, as is shown shaded with a lattice pattern in FIG. 1(b), a mutual rubbing surface between the central flat surface 9 of the cylindrical roller 8 and the outside diameter side circumferential edge portion 22 of the pocket 7 falls within a range of the thickness of a metal plate which makes up the cage 2. In other words, the chamfered portion 11 faces, of the outside diameter side circumferential edge portion 22 of the pocket 7, a portion which lies apart from a revolution axis of the cylindrical roller 8 so as to be closer to a surface of the outside diameter side flat plate portion 14, so that a clearance is made to exit between the portion which lies closer to the surface of the outside diameter side flat plate portion 14 and the chamfered portion 11 (the relevant portions are made not to rub against each other).

Furthermore, in the case of this embodiment, as is shown in FIGS. 1(c) and (d), a difference between an amount $\Delta_B$ by which part of the cylindrical roller 8 projects from the external surface of the outside diameter side flat plate portions 14 which makes up the cage 2 in such a state that the cage 2 is displaced to the other axial end side (an upper side in FIG. 1) relative to the cylindrical roller 8 so as to bring respective central locking portions 20, 20 with the rolling surface 10 of the cylindrical roller 8 and the dimension $W_{11}$ of the chamfered portion 11 with respect to the diameter direction of the cylindrical roller 8 ($W_{11} - \Delta_B$) is made to be smaller than a thickness $T_2$ of the metal plate which makes up the cage 2 $\{(W_{11} - \Delta_B) < T_2\}$. Consequently, even in such a state that the respective central locking portions 20, 20 and the rolling surface 10 of the cylindrical roller 8 are brought into engagement with each other, as is shown shaded with a lattice pattern in FIG. 1(d), the central flat surface 9 of the cylindrical roller 8 and the outside diameter side circumferential edge portion 22 of the pocket 7 rub against each other. In other words, there occurs no case where an internal end edge of the outside diameter side circumferential edge portion 22 and the chamfered portion 11 are caused to rub against each other (an edge collision is caused therebetween).

In order to control the projecting amounts (the maximum projecting amounts) $\Delta_A$, $\Delta_B$ to fall within the ranges described above, in the case of this embodiment, as is shown in FIG. 2, a space $D_{18}$ between the pair of outside diameter side locking portions 18, 18 (=a space $D_{19}$ between the pair of inside diameter side locking portions 19, 19) and a space $D_{20}$ between the pair of central locking portions 20, 20 are controlled in relation to the diameter $D_8$ (refer to FIG. 1) of the cylindrical roller 8, each pair of locking portions being disposed in each pocket 7 in such a manner as to face each other.

Figure 20:
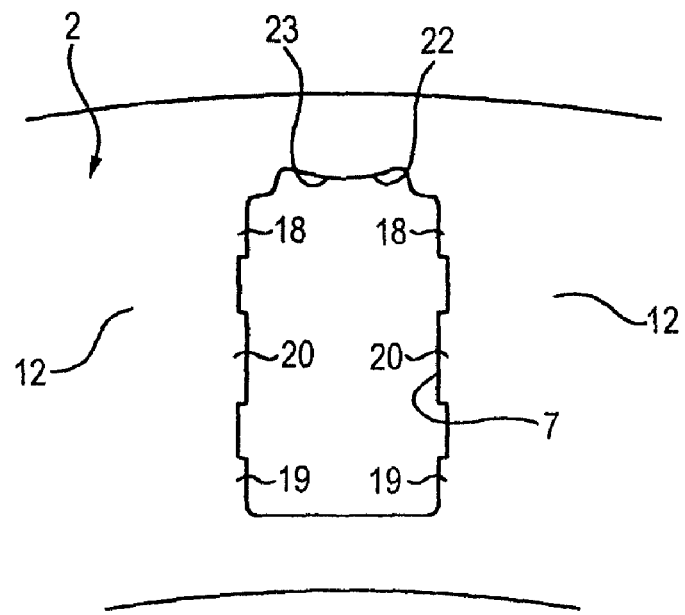
FIG. 20
Figure 21:
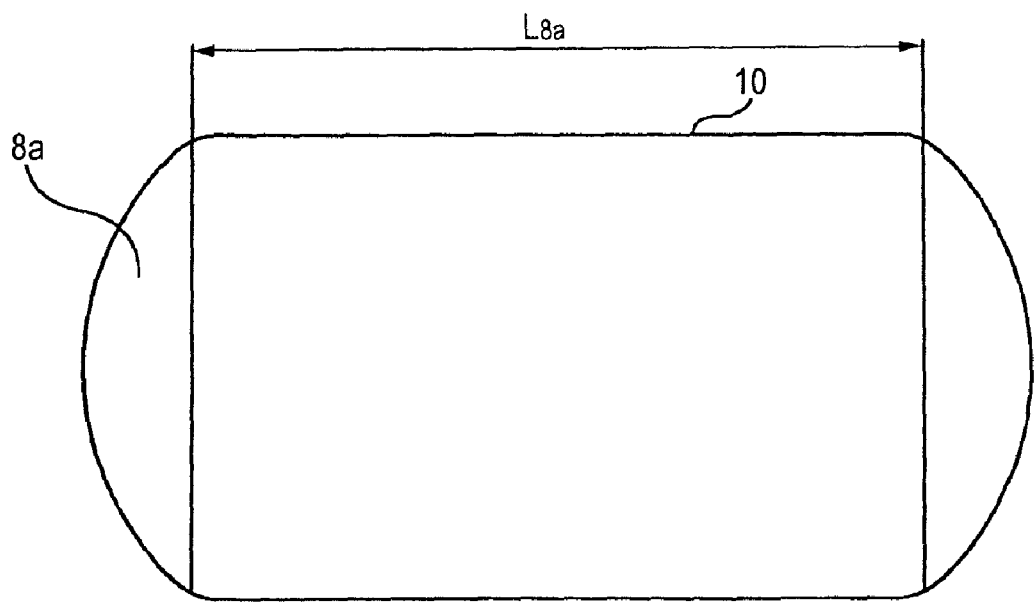
FIG. 21
Figure 22:
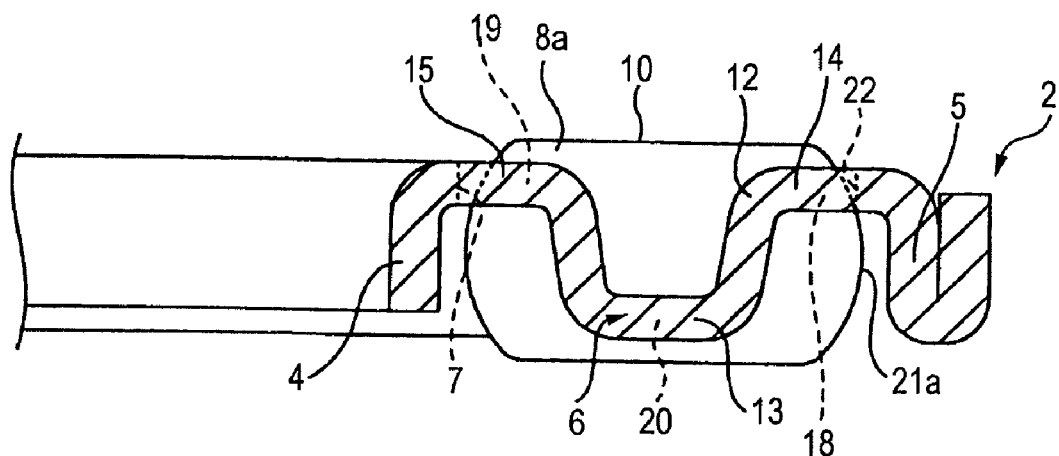
FIG. 22
Figure 23:
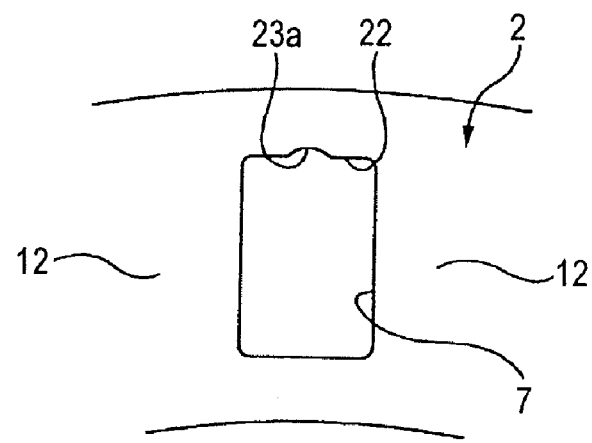
FIG. 23
Figure 24:
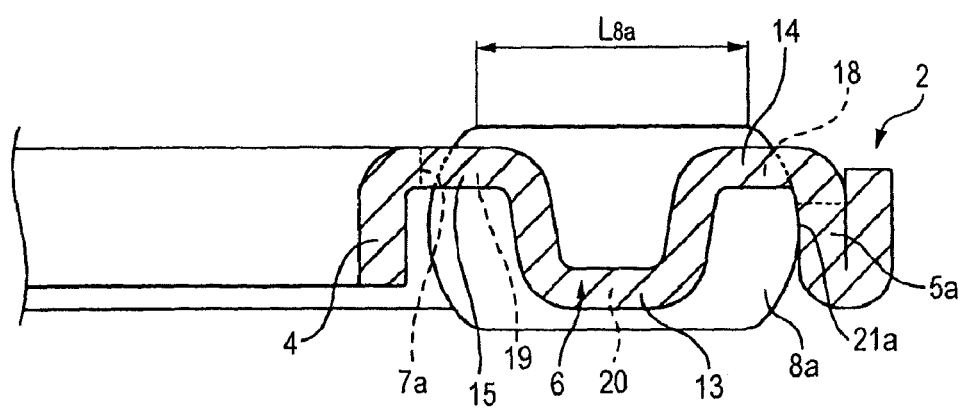
FIG. 24

In the case of this embodiment, by the configuration that has been described above, the portion of the outside diameter side circumferential edge portion 22, which is apart from the revolution center axis of the cylindrical roller 8 so as to be closer to the surface {an upper surface in FIG. 1(a)}, and the outside diameter side end face 21 of the cylindrical roller 8 are made not to rub against each other. In other words, the mutual rubbing portion between the outside diameter side circumferential edge portion 22 of the pocket 7 and the outside diameter side end face 21 of the cylindrical roller 8 which is held in the pocket 7 is, as is shown shaded with the lattice pattern in FIG. 1(b), located in the position which lies closer to a circumferentially central portion of the pocket 7. Because of this, a local concentration of stress, which would otherwise be generated at the mutual rubbing portion due to the offset collision being produced by the skewing of the cylindrical roller, is made difficult to be generated, and furthermore, the sliding speed V at the mutual rubbing portion is suppressed to a low level. As a result of this, the formation of a concavely recessed portion 23 such as shown in FIG. 20 described before by wear can be prevented. In addition, the internal end edge of the outside diameter side circumferential edge portion 22 and the chamfered portion 11 are in no case brought into edge collision with each other, and hence, no remarkable wear is produced at the relevant portion.

Furthermore, in the case of this embodiment, since the axial positioning of the cage 2 is realized by the engagement of the respective locking portions 18 to 20 which are formed along each pocket 7 and the rolling surface 10 of each cylindrical roller 8, the axial side surfaces of the cage 2 is caused in no case to rub against the mating raceway surfaces. Because of this, the scraping of lubricating oil which adheres to the raceway surfaces by the cage 2 can be prevented, so as to lubricate well the rolling contact portion between the raceway surfaces and the rolling surface 10 of each of the cylindrical rollers 8. Because of this, even under a severe service condition, the prevention of damage to the rolling surface 10 and the respective mating raceway surfaces can be realized.

The following Table 1 shows the results of an experiment which is carried out to verify the advantage of this embodiment. The experiment is carried out under the following conditions; a thrust load is driven at a revolution speed twice a permissible revolution speed for 100 hours in such a state that a thrust load which is 15% of a dynamic load rating is being applied to the thrust cylindrical roller bearing, and thereafter, wear is observed at each portion of interest. A lubricating oil used is an AT fluid, and the temperature is the room temperature.

TABLE 1

| Classification | Cage Guide Type | $\Delta_A/W_{11}$ | $(W_{11} - \Delta_B)/T_2$ | Cage Drilling wear Damage | Bearing Flaking |
|---|---|---|---|---|---|
| Embodiment | Roller guide | 0.8 | 0.95 | none | none |
|  |  | 0.8 | 0.8 | none | none |
|  |  | 1.0 | 0.7 | none | none |
| Comparison Example | Roller guide | 1.1 | 0.7 | caused | none |
|  |  | 1.4 | 0.6 | caused | none |
|  | Race guide | 0.6 | — | none | caused |
|  |  | 1.5 | — | caused | caused |

As is obvious from the results of the experiment shown in Table 1 above, according to the construction of this embodiment, the wear of the outside diameter side circumferential edge portion 22 of the pocket 7 provided in the cage 2 can be suppressed, the drilling wear of the outside diameter side end portion of the cylindrical roller 8 under the one side of the portion of the cage 2 which lies closer to the outside diameter side thereof due to the wear that would otherwise be produced can be prevented, and moreover, the lubrication of the rolling contact portion can be implemented well.

Figure 3:
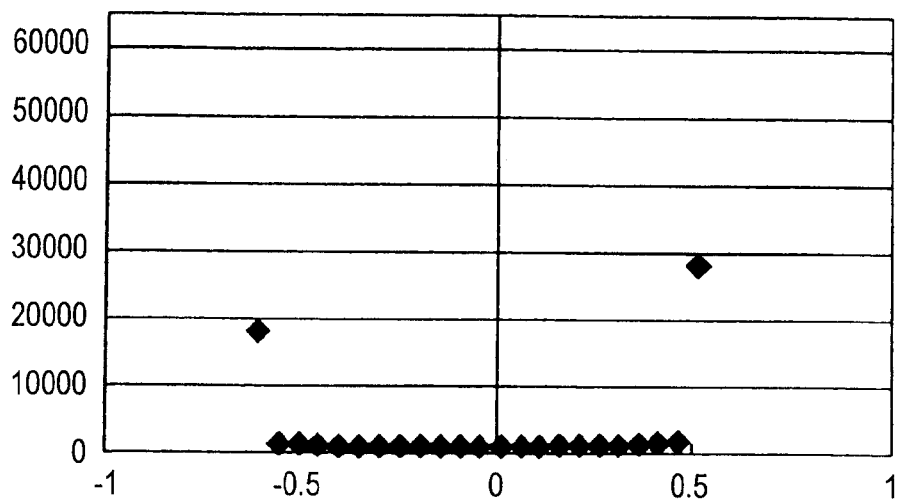
FIG. 3
Figure 3:
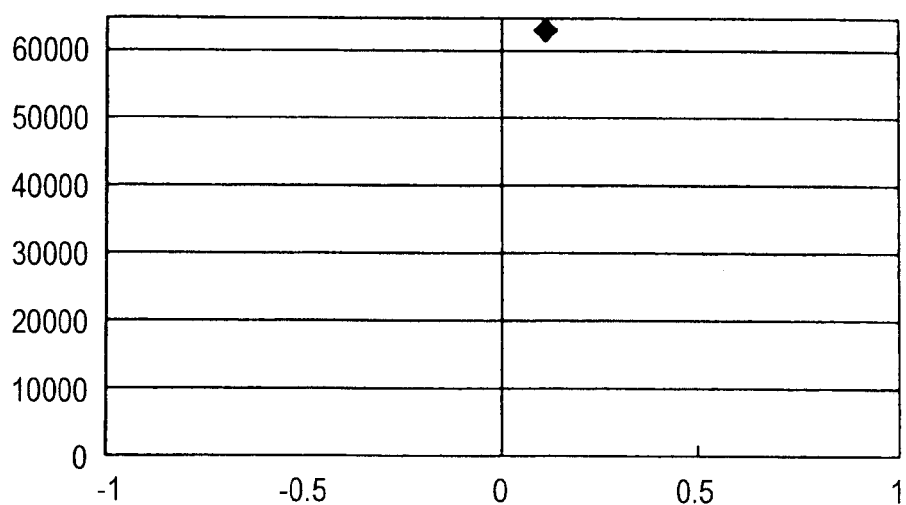
Figure 19:
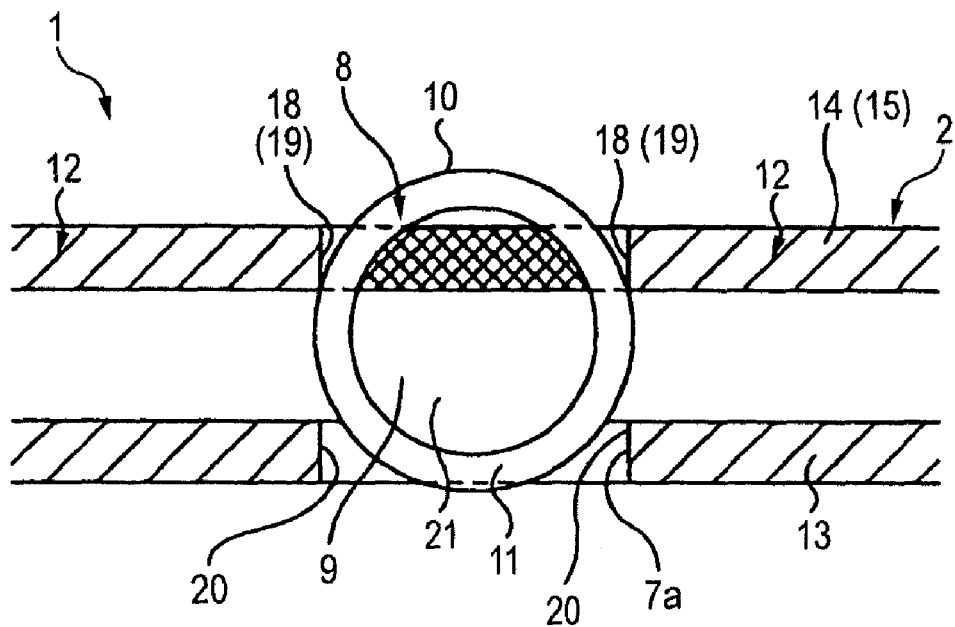
FIG. 19
Figure 19:
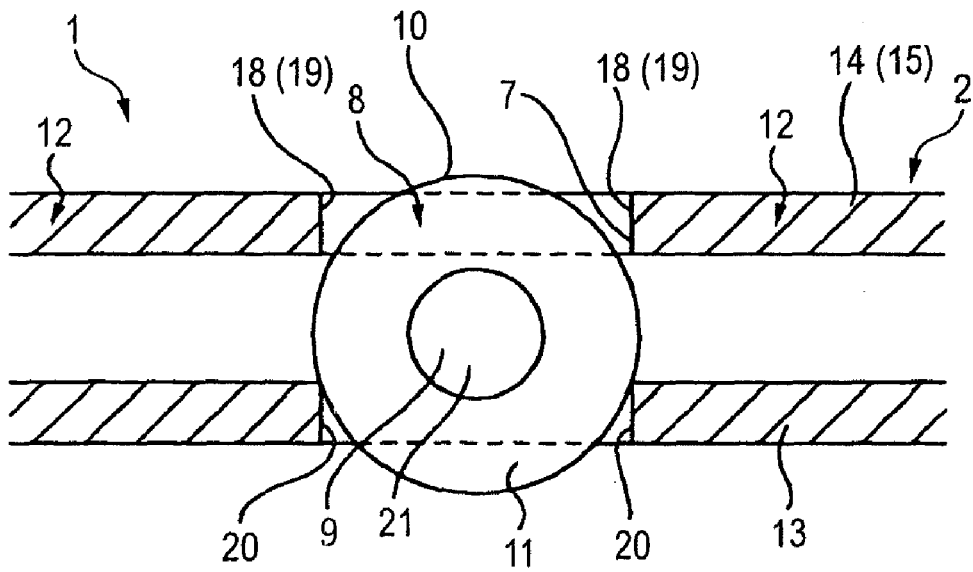

In addition, for the purpose of verifying the advantage of this embodiment, FIG. 3 shows qv values (a multiplied value of load×sliding speed) obtained at contact positions on the cylindrical rollers 8 whose chamfered portions 11 have the same dimension $W_{11}$ in the embodiment in which even though the cage 2 is displaced to the axial direction relative to the cylindrical roller 8, the cylindrical roller 8 rubs against the outside diameter side circumferential edge portion 22 of each pocket 7 at the central flat surface 9 thereof and in the related art example shown in FIG. 19(b) in which the inner circumferential side end edge of the outside diameter side circumferential edge portion 22 is brought into edge collision with the chamfered portion 11 by virtue of the axial displacement of the cage 2. Note that the revolution speed of the bearing is 17300 rpm, the axial load is 460 N, and the number of rollers used is 50, and the same conditions are adopted except for the projecting amount $\Delta_E$ from the external surface of the outside diameter side flat plate portion 14.

As a result, with the related art example shown in FIG. 3(b), the cylindrical rollers 8 became very unstable, and since the outside diameter side end face 21 of the cylindrical roller 8 is in point contact with the outside diameter side circumferential edge portion 22 of the pocket 7, it is seen that the qv value is increased and hence that a partial wear is produced. In contrast to this, with the embodiment, as is shown in FIG. 3(a), since the contact locations do not converge and the qv value is decreased, it is seen that the wear is decreased.

In addition, with a pair of members 40, 41 (refer to FIG. 15) having raceway surfaces 40a, 41a which are brought into rolling contact with the rolling surface 10 of each of the cylindrical rollers 8 both made to revolve when in use, the central flat plate portion 13 of the cage 2 is made to face the member 41 whose revolution speed when in use is faster. In the event that a configuration like this is adopted, more lubricating oil can be fed into the mutual rubbing portion between the outside diameter side end face 21 of each cylindrical roller 8 and the outside diameter side circumferential edge portion 22 of the cage 2, thereby making it possible to make difficult the occurrence of metal contact at the mutual rubbing portion.

Embodiment 2

Figure 4:
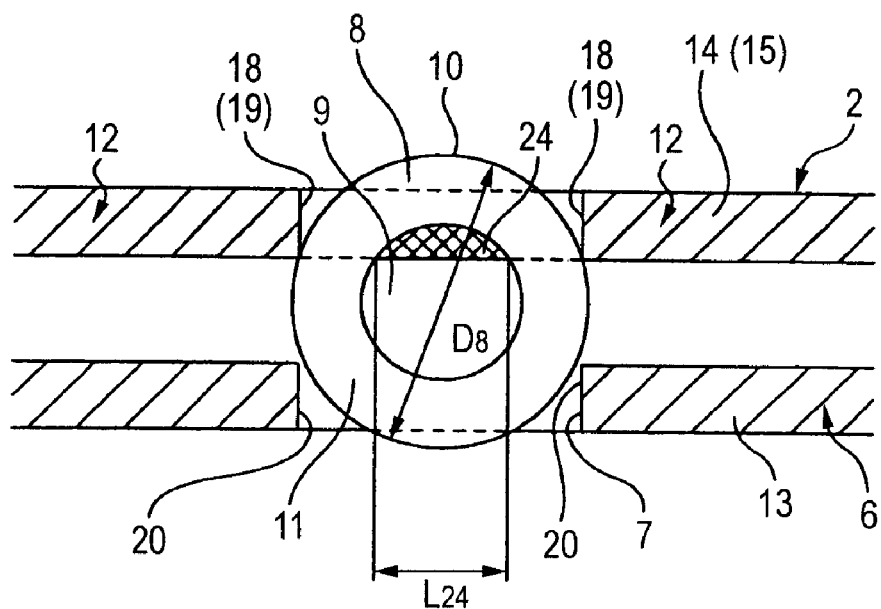
FIG. 4

FIG. 4 shows Embodiment 2 of the invention which corresponds to the first to second inventions. Note that a feature of this embodiment also resides in a fact that even though a cylindrical roller in which a central flat surface 9 is provided at a central portion of axial end faces thereof is used as each of cylindrical rollers 8, the occurrence of wear such as leads to the concavely recessed portion 23 shown in FIG. 20 described above at an outside diameter side circumferential edge portion 22 of each of a plurality of pockets 7 provided in a radial direction in an intermediate plate portion 6 which makes up a cage 2 is prevented by controlling the movement of each cylindrical roller 8 within each pocket 7 in relation to a diameter dimension (the diameter of the central flat surface 9 formed at the central portion) of chamfered portions 11 which are formed at portions on both the axial end faces of each cylindrical roller 8 which lie closer to an outside diameter side thereof. Since the configuration and function of the other portions are similar to those of the related art construction shown in FIGS. 15 to 18 described above, the repetition of similar illustrations and descriptions will be omitted or they will be briefly made, so that characteristic parts of the embodiment will mainly be described below.

In the case of this embodiment, as is shown in FIG. 4, in such a state that the cage 2 is displaced to one axial end side (a lower side in FIG. 4) relative to the cylindrical roller 8 so as to bring individual outside diameter side locking portions 18, 18 and individual inside diameter side locking portions 19, 19 with a rolling surface 10 of the cylindrical roller 8, the central flat surface 9 provided on the axial end face of the cylindrical roller 8 and the outside diameter side circumferential edge portion 22 of the pocket 7 are brought into sliding contact with each other at a mutual rubbing surface 24 that is shown shaded with a lattice pattern in FIG. 4. In the case of this embodiment, a length $L_{24}$ of this mutual rubbing surface 24 with respect to a circumferential direction of the cage 2 is controlled to fall within 80% or less ($L_{24} \leqq 0.8 D_8$) and preferably within a range of 40 to 70% $\{L_{24}=0.4$ to $0.7)D_8\}$ of a diameter $D_8$ of the cylindrical roller 8. A specific construction which controls the length $L_{24}$ of the mutual rubbing surface 24 is similar to that of Embodiment 1 which has been described before. In the case of this embodiment, too, as with Embodiment 1, the occurrence of such wear as leads to the drilling wear of the cylindrical roller 8 can be prevented.

Embodiment 3

Figure 5:
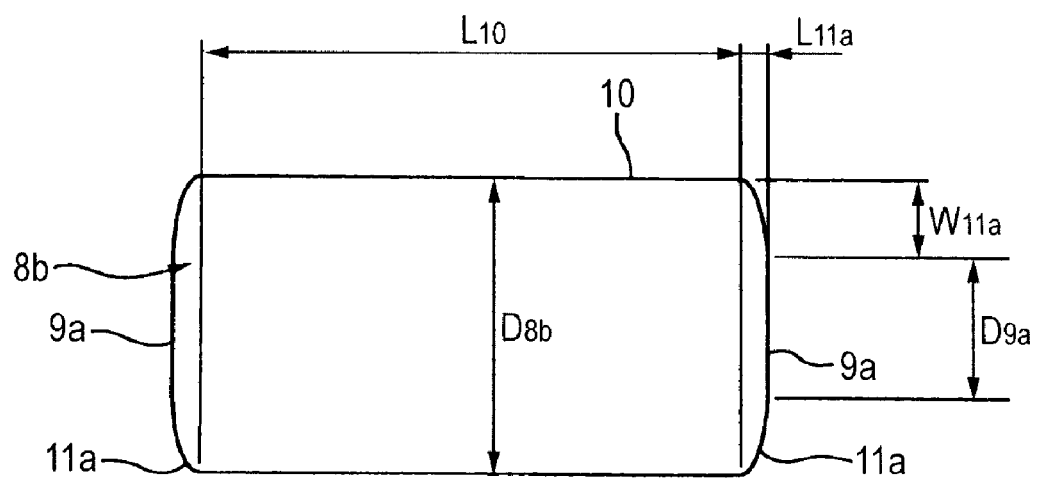
FIG. 5
Figure 6:
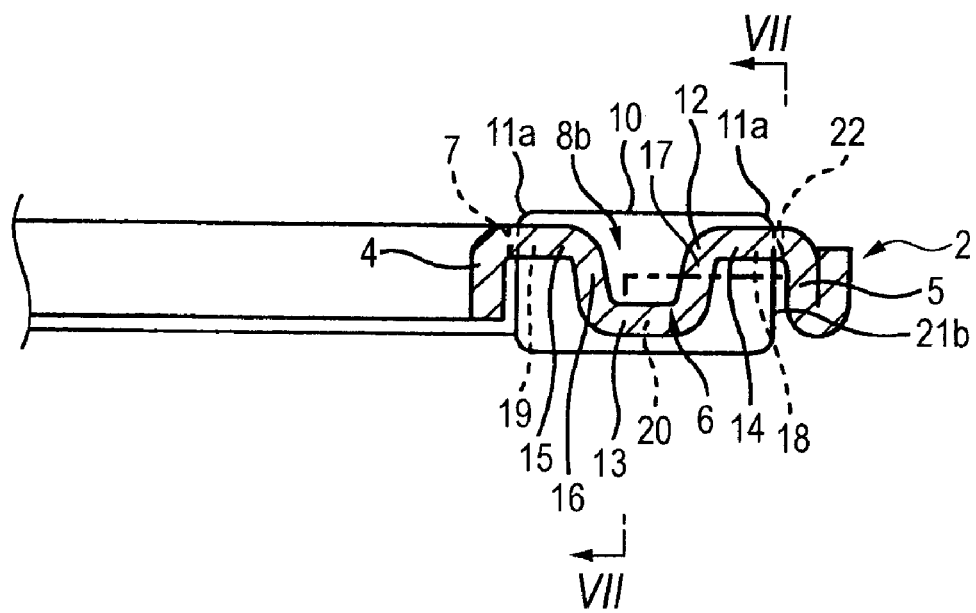
FIG. 6
Figure 7:
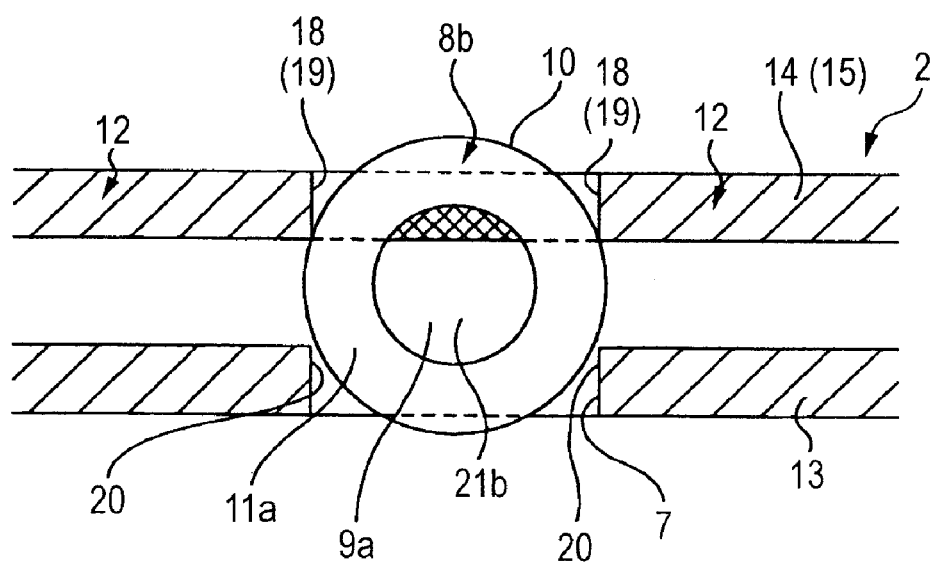
FIG. 7

FIGS. 5 to 7 show Embodiment 3 of the invention which corresponds to the first to third inventions. Note that a feature of this embodiment resides in a fact that even though a cylindrical roller in which a central flat surface 9a is provided at a central portion of axial end faces thereof is used as each of cylindrical rollers 8b, the occurrence of such wear as leads to the concavely recessed portion 23 shown in FIG. 20 described above at an outside diameter side circumferential edge portion 22 of each of a plurality of pockets 7 provided in a radial direction in an intermediate plate portion 6 which makes up a cage 2 is prevented by controlling the configuration and dimensions of chamfered portions 11a, 11a formed on both the axial end faces of each cylindrical roller 8b at a portion lying closer to an outside diameter side thereof in relation to the movement of each cylindrical roller 8b within each pocket 7. Since the configuration and function of the other portions are similar to those of the related art construction shown in FIGS. 15 to 18 described above, the repetition of similar illustrations and descriptions will be omitted or they will be briefly made, so that characteristic parts of the embodiment will mainly be described below.

In the case of this embodiment, in each of the cylindrical rollers 8, of dimensions of the chamfered portions 11a, 11a which are formed on both the respective axial end faces at the portion lying closer to the outside diameter side thereof, a direction $W_{11a}$ in a diameter direction of each cylindrical roller 8b is made larger than a dimension $L_{11a}$ in an axial direction thereof ($L_{11a} < W_{11a}$). Consequently, a diameter D a of the central flat surface 9a that is formed at the central portion of both the axial end faces of each cylindrical roller 8b which is built in this embodiment is smaller than the diameter $D_9$ (refer to FIG. 16) of the central flat surface 9 that is formed at the central portion of both the axial end faces of the cylindrical roller 8 which is built in the related art construction ($D_{9a} < D_9$). In other words, in the case of this embodiment, a boundary portion between the central flat surface 9a and both the chamfered portions 11a, 11a is situated closer to a (revolution) center axis of each cylindrical roller 8b than the boundary portion of the related art construction is. Note that an extent to which the diameter dimension $W_{11a}$ is made larger than the axial dimension $L_{11a}$ is preferably on the order of 1.1 to 2 times the latter.

In the case of this embodiment, by controlling the dimensions of both the chamfered portions 11a, 11a in the manner described above, the wear of a mutual rubbing portion between the outside diameter side end face 21b of each cylindrical roller 8b and an outside diameter side circumferential edge portion 22 of each pocket 7 is suppressed while securing an axial length $L_{10}$ of the rolling surface 10 of each cylindrical roller 8b (=an effective length of each cylindrical roller 8b), and as with Embodiment 1 that has been described before, the occurrence of such wear as leads to the drilling wear of the cylindrical roller 8b can be prevented.

In addition, in the case of this embodiment, as each cylindrical roller 8b, the cylindrical roller is used in which the central flat surface 9a is provided on both the axial end faces which expands in a direction at right angles to the revolution center axis of the cylindrical roller 8b and the central flat surfaces 9a and the rolling surface 10 are continuously connected via the chamfered portions 11a having the dimensions $L_{11a}$, $W_{11a}$ described above. Because of this, the axial length $L_{10}$ of the rolling surface 10 (=the effective length of each cylindrical roller 8b) is increased, whereby the design to secure the load-carrying capacity of the thrust cylindrical roller bearing in which the cylindrical roller 8 is built is facilitated.

Embodiment 4

Figure 8:
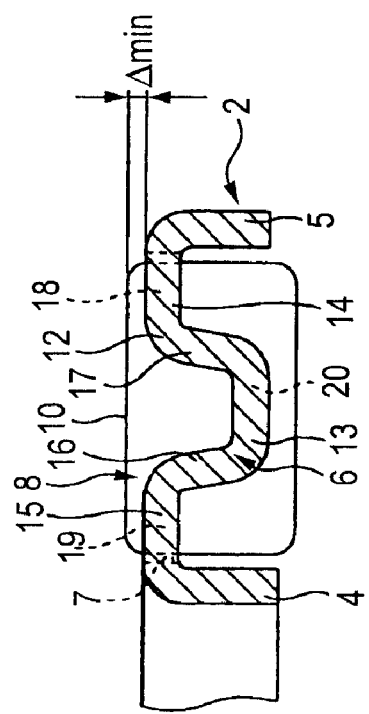
FIG. 8
Figure 8:
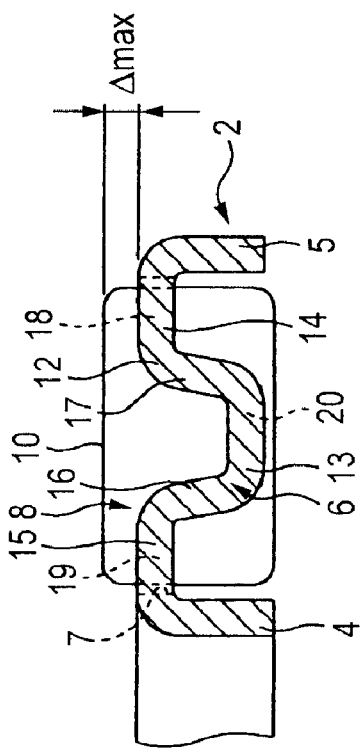

Embodiment 4 will be described by reference to FIG. 8. When carrying out the first to third embodiments that have been described heretofore, a displace amount of each cylindrical roller 8 in the axial direction of a cage 2 within each pocket 7 is secured to some extent. To control this displacement amount, two states illustrated in FIG. 8 will be considered. Of these, a state shown in FIG. 8(a) is such that the cage 2 is displaced to one axial end side so as to bring individual outside diameter side locking portions 18 and individual inside diameter side locking portions 19 into engagement with a rolling surface 10 of each cylindrical roller 8. An amount by which part of each cylindrical roller 8 projects from external surfaces of outside diameter side and inside diameter side flat plate portions 14, 15 which make up the cage 2 in this state is made to be $\Delta_{max}$. In contrast to this, a state shown in FIG. 8(b) is such that the cage 2 is displaced to the other axial end side so as to bring individual central locking portions 20 into engagement with the rolling surface 10 of each cylindrical roller 8. An amount by which part of each cylindrical roller 8 projects from the external surfaces of the outside diameter side and inside diameter side flat plate portions 14, 15 in this state is made to be $\Delta_{min}$. Then, a difference ($\Delta_{max}-\Delta_{min}$) between both the projecting amounts $\Delta_{max}$, $\Delta_{min}$, that is, a looseness amount in the axial direction of the cage 2 relative to the cylindrical roller 8 is made to be 50 µm or more.

As in Embodiments 1 to 3 that have been described before, in the event that the looseness amount of 50 µm or more is secured while satisfying the conditions for realizing the axial positioning of the cage by the roller guide, a clearance between the rolling surface 10 of each cylindrical roller 8 and both circumferential side edges of each of pillar portions 12 which make up the cage 2 can be secured sufficiently. Because of this, the scraping of lubricating oil which adheres to the rolling surface 10 of each cylindrical roller 8 by both the circumferential side edges of each pillar portion 12 can be prevented, thereby making it possible to supply a sufficient amount of lubricating oil to a rolling contact portion between the rolling surface 10 of each cylindrical roller 8 and mating raceway surfaces. Then, a sufficient oil film is formed on each rolling contact portion to thereby realize the securing of the rolling fatigue life of the rolling surface 10 of each cylindrical roller 8 and the mating raceway surfaces.

Embodiment 5

Figure 9:
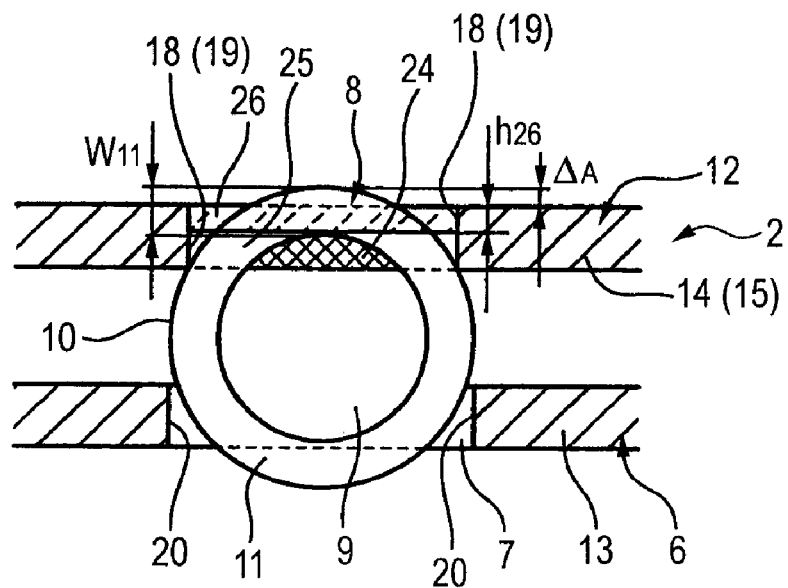
FIG. 9
Figure 9:
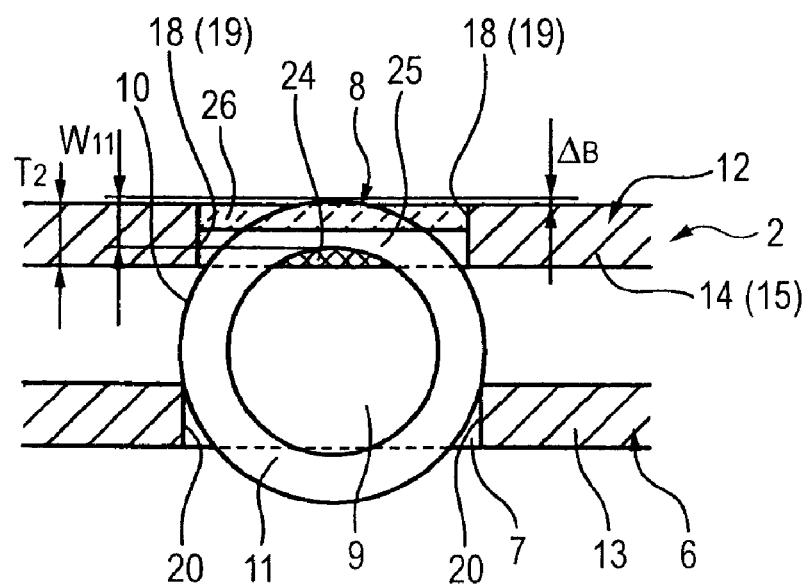
Figure 10:
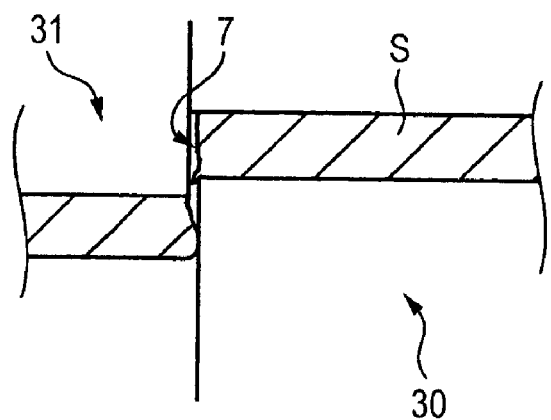
FIG. 10
Figure 10:
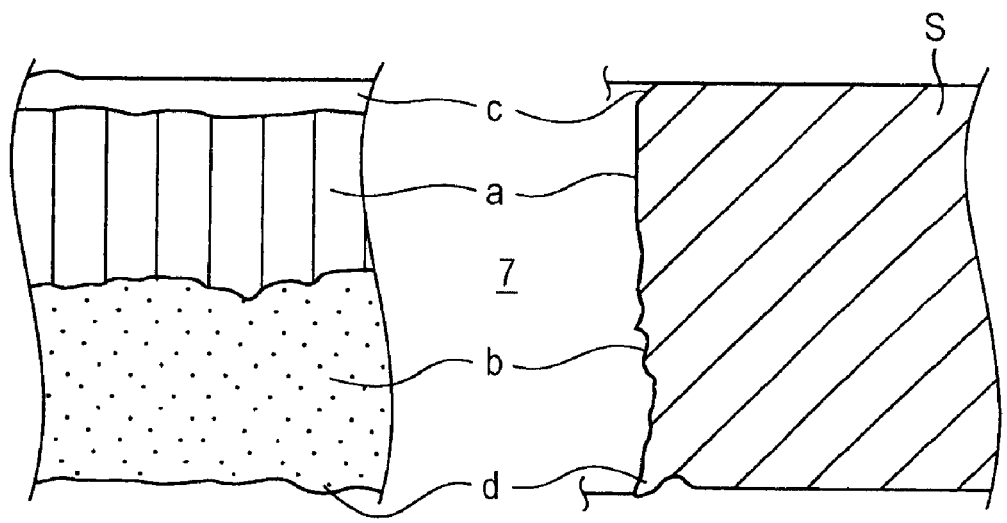

Embodiment 5 will describe the six invention by reference to FIGS. 9 to 11. FIG. 9(a) is a sectional view, corresponding to FIG. 1(b), which shows a state in which a thrust cylindrical roller bearing is taken on an imaginary plane which includes a center axis of a cage, with the case displaced to one axial end side relative to a cylindrical roller, and FIG. 9(b) is a sectional view, corresponding to FIG. 1(d), which shows a state in which the thrust cylindrical roller bearing is taken on the imaginary plane which includes the center axis of the cage, with the case displaced to the other axial end side relative to the cylindrical roller.

Embodiment 5 is an embodiment in which the amount, described in Embodiment 1, by which part of each cylindrical roller 8 projects from the external surfaces of the outside diameter side and inside diameter side flat plate portions 14, in such a state that the cage 2 is displaced to one axial end side relative to the cylindrical roller so as to bring the individual outside diameter side locking portions 18 and the individual inside diameter side locking portions 19 into engagement with the rolling surface 10 of each cylindrical roller 8 is controlled more preferably. To be specific, a shear surface 25 on the outside diameter side circumferential edge portion 22 of the pocket 7 that is formed when a pressing process (a press-cutting process) is carried out is formed at a portion which is closer to the revolution center axis of each cylindrical roller 8, and the central flat surface 9 of each cylindrical roller 8 is in contact with only the shear surface 25 while the roller bearing is in revolution.

As is shown in FIG. 10, in general, a cage 2 is made by placing sheet steel S on a die 30 and press-cutting a pocket 7 by means of a punch 31. As this occurs, a shear surface a cut by the punch 31, a cut area b which has an external appearance as torn as a result of cracks being generated in the sheet steel S during the cutting by the punch 31 and becomes substantially as tall as the shear surface a, and furthermore, sags and burrs are produced on an end face of the pocket 7. The shear surface a has a better surface roughness than that of the cut area b.

Because of this, a pocket 7 of the cage 2 shown in FIG. 11(a) is worked by placing a surface which constitutes external surfaces of outside diameter side and inside diameter side flat plate portions 14, 15 on the die and press-cutting the surface by the punch from a direction indicated by an arrow X, whereby a shear surface 25 is formed on an outside diameter side circumferential edge portion 22 of the pocket 7 so formed at a portion which is closer to the revolution center axis of each cylindrical roller 8, and a cut area 26 is formed at a portion which is farther apart from the revolution center axis of the cylindrical roller 8 than the shear surface 25 is and closer to the surface of the outside diameter side flat plate portion 14 (refer to FIG. 11 (b)). The surface roughness Ra of this shear surface 25 is substantially the same as that of a material prior to the working, which is of the order of 0.15 to 0.5 µm, and the surface roughness Ra of the cut area 26 is 1.0 to 2.5 µm.

In addition, as is shown in FIG. 9(a), an amount $\Delta_A$ by which part of each cylindrical roller 8 projects from the external surfaces of the outside diameter side and inside diameter side flat plate portions 14, 15 in such a state that the cage 2 is displaced to one axial end side so as to bring the individual outside diameter side locking portions 18 and the individual inside diameter side locking portions 19 into engagement with the rolling surface 10 of each cylindrical roller 8 is made smaller than a value resulting by subtracting a cut area height $h_{26}$ from a dimension $W_{11}$ of a chamfered portion with respect to a diameter direction of the cylindrical roller 8 ($\Delta_A < W_{11} - h_{26}$), whereby the central flat surface 9 of each cylindrical roller 8 is brought into contact with only the shear surface 25 of the outside diameter side circumferential edge portion 22 of each pocket 7 in such a state that the cage 2 is displaced to one axial end side so as to bring the individual outside diameter side locking portions and the individual inside diameter side locking portions into engagement with the rolling surface 10 of each cylindrical roller 8.

Furthermore, as is shown in FIG. 9(b), as with Embodiment 1, in such a state that the cage 2 is displaced to the other axial end side relative to each cylindrical roller 8 so as to bring the individual central locking portions 20, 20 into engagement with the rolling surface 10 of the cylindrical roller 8, a difference ($W_{11} - \Delta_B$) between an amount $\Delta_B$ by which part of each cylindrical roller 8 projects from the external surface of the outside diameter side flat plate portion 14 and the dimension $W_{11}$ of the chamfered portion 11 with respect to the diameter direction of the cylindrical roller 8 is made smaller than a thickness $T_2$ of the metal plate which makes up the cage 2 $\{(W_{11} - \Delta_B) < T_2\}$. Consequently, the central flat surface 9 of each cylindrical roller 8 never fails to be brought into contact with the shear surface 25 on the outside diameter side circumferential edge portion 22 of each pocket 7, even though the cage 2 is displaced to one axial end side or the other axial end side while the roller bearing is in revolution.

Note that the surface roughness Ra of the central flat surface 9 of each cylindrical roller 8 is made to be 0.3 µm or less. In addition, as is shown in FIG. 9(b), the rolling surface 10 of each cylindrical roller 8 is brought into contact with the individual central locking portions 20, 20 in such a state that the cage 2 is displaced to the other axial end side relative to the cylindrical roller 8.

Since the central flat surface 9 of each cylindrical roller 8 never fails to be brought into contact with the shear surface 25 on the outside diameter side circumferential edge portion 22 of each pocket 7 while the roller bearing is in revolution in the way described above, the surface roughness of the outside diameter side circumferential edge portion 22 of each pocket 7 which is brought into contact with each cylindrical roller 8 is improved, whereby the looseness amount (the moving amount in the axial direction) of each cylindrical roller 8 is decreased, so as not only to suppress the occurrence of skewing but also to cause a sufficient oil film for lubrication to be formed on a mutual rubbing surface 24. As a result of this, the drilling wear of an outside diameter side end portion of each cylindrical roller 8 under one surface side of the cage 2 at a portion lying closer to an outside diameter side thereof can be prevented effectively.

Next, in order to verify the advantage of this embodiment, an experiment is carried out on a cage having an inside diameter of 50 mm, an outside diameter of 70 mm and a thickness of 0.5 mm by revolving at high speeds while varying an amount $\Delta_A$ by which part of each cylindrical roller 8 projects from external surfaces of individual outside diameter side and inside diameter side flat plate portions 14, 15, an amount $\Delta_B$ by which part of each cylindrical roller 8 projects from the external surface of the outside diameter side flat plate portion 14, a dimension $W_{11}$ of a chamfered portion 11 with respect to the diameter direction of each cylindrical roller 8 and a cut area height h26, and the results of the experiment is shown in Table 2. In addition, a test bearing used is such that the surface roughness Ra of an end face of the roller is 0.35 to 0.4 µm and the surface roughness Ra of an end face of a pocket in the cage is 3.0 to 3.5 µm, and the experiment is carried out under the following conditions.

(Test Conditions)
Revolution speed: twice a permissible revolution speed
Load: No load applied
Lubricating oil: ATF

TABLE 2

Test results (pocket end face wear depth, µm)

| | ($\Delta_A$ + h26)/$W_{11}$ | | | |
|---|---|---|---|---|
| ($W_{11} - \Delta_B$)/$T_2$ | 1.23 | 1.06 | 0.95 | 0.69 |
| 1.20 | 16.2 | 12.3 | 10.1 | 8.9 |
| 1.11 | 10.5 | 9.9 | 5.2 | 5.3 |
| 0.98 | 5.8 | 4.6 | 2.9 | 3.1 |
| 0.82 | 6.3 | 4.2 | 3.0 | 2.7 |

It is seen from the results shown in Table 2 that by controlling $\Delta_A < W_{11} - h_{26}$, that is, $\Delta_A + h_{26}/W_{11}$, and $(W_{11} - \Delta_B) < T_2$, that is, $(W_{11} - \Delta_B)/T_2 < 1$, the wear depth on the end face of the pocket 7 can be suppressed, whereby the drilling wear of the outside diameter side end portion of the cylindrical roller 8 under the one surface side of the cage 2 at the portion lying on the outside diameter side thereof can be prevented effectively.

Embodiment 6

Figure 12:
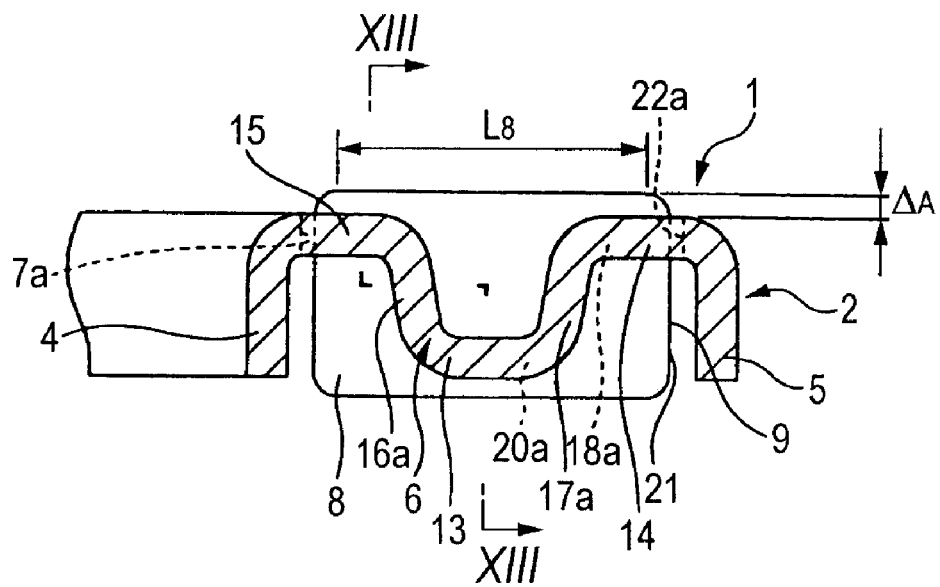
FIG. 12
Figure 12:
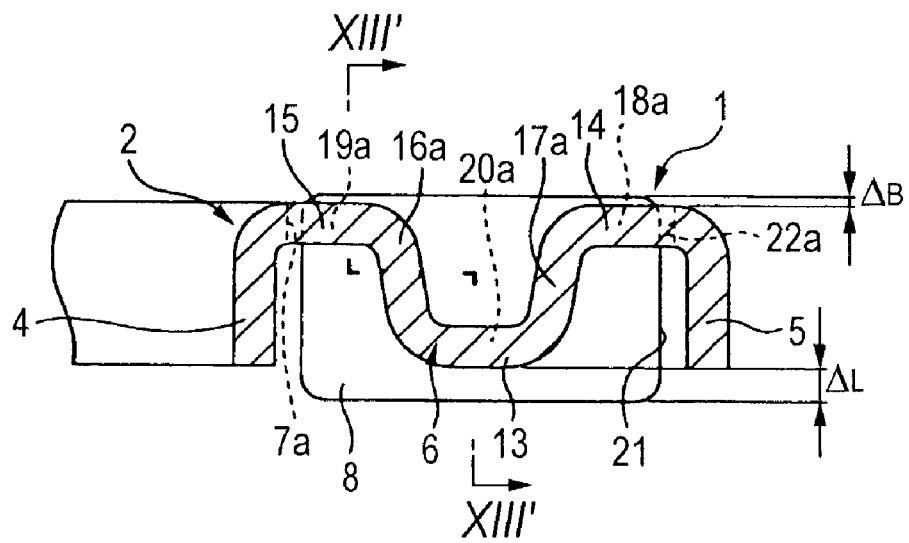
Figure 13:
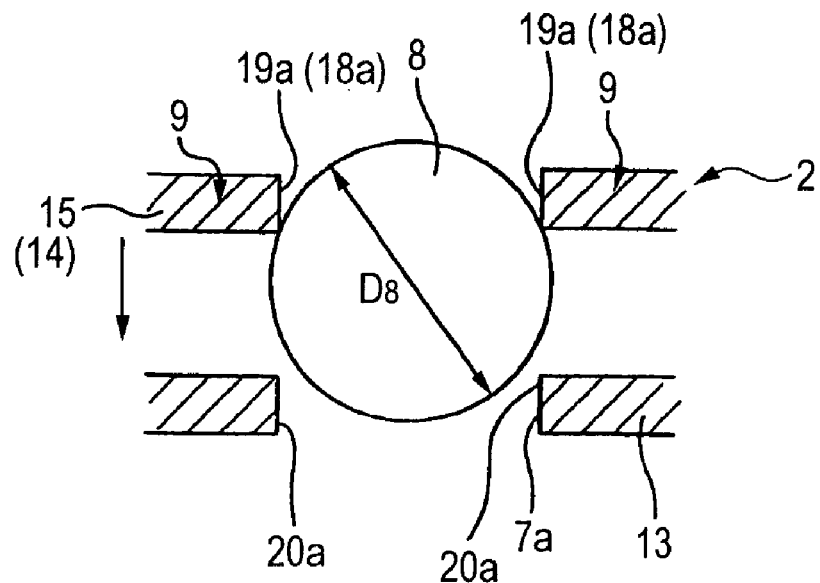
FIG. 13
Figure 13:
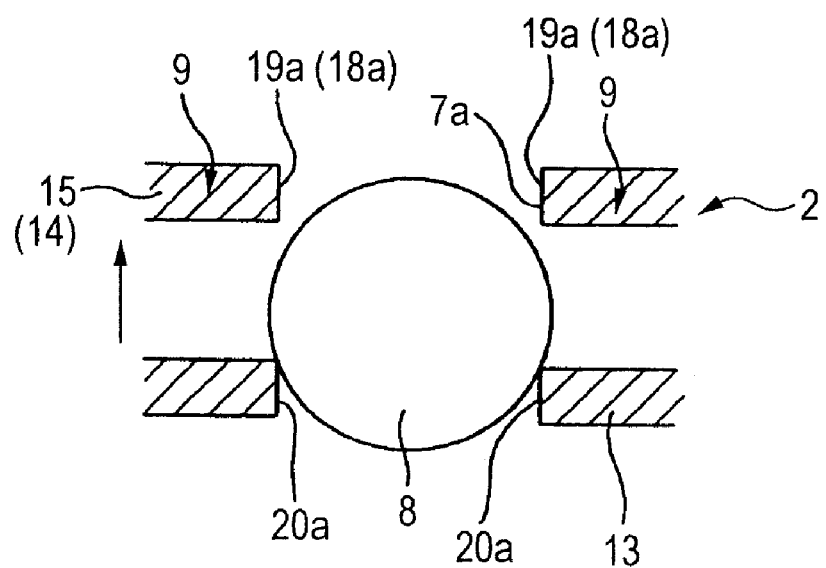
Figure 14:
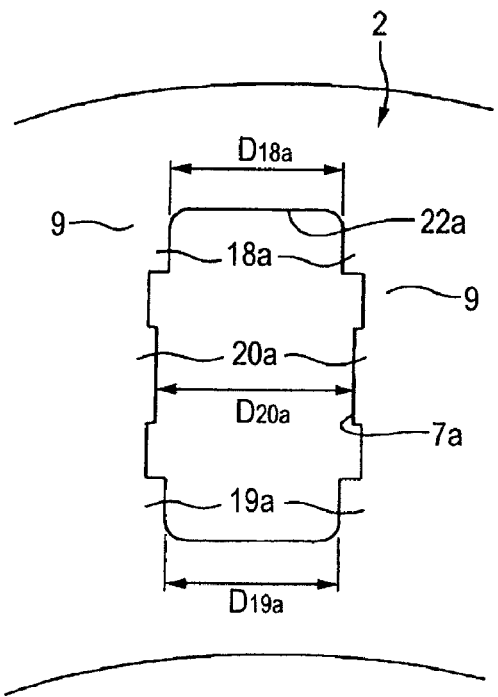
FIG. 14
Figure 15:
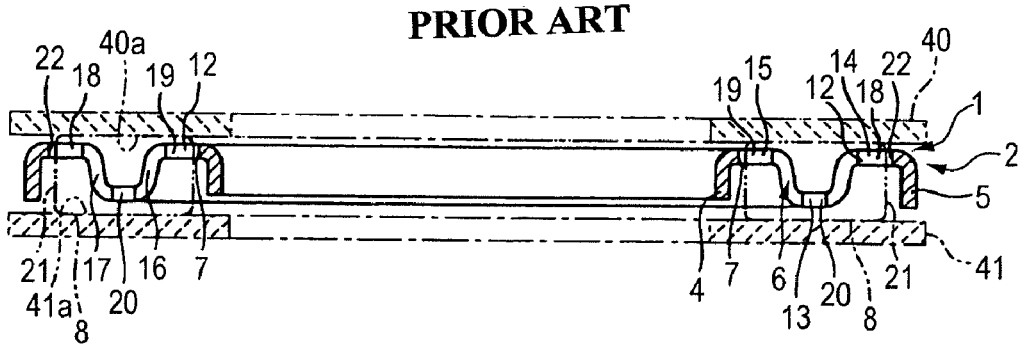
FIG. 15
Figure 16:
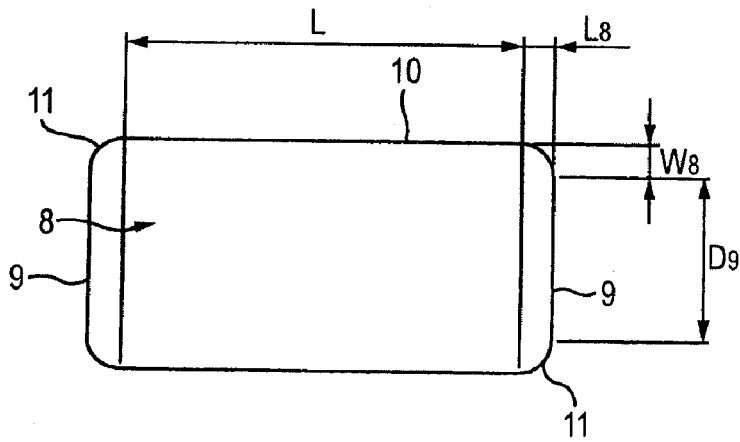
FIG. 16

FIGS. 12 to 14 show Embodiment 6 of the invention. Note that a feature of this embodiment resides in a fact that even though a cylindrical roller in which a central flat surface 9a is provided at a central portion of axial end faces thereof is used as each of cylindrical rollers 8b, the occurrence of such wear as leads to the concavely recessed portion 23 shown in FIG. 20 described above at an outside diameter side circumferential edge portion 22a of each of a plurality of pockets 7a provided in a radial direction in an intermediate plate portion 6 which makes up a cage 2 is prevented by controlling the movement of each cylindrical roller 8 within each pocket 7a. Since the configuration and function of the other portions are similar to those of the related art construction shown in FIGS. 15 to 18 described above, the repetition of similar illustrations and descriptions will be omitted or they will be briefly made, so that characteristic parts of the embodiment will mainly be described below.

In the case of this embodiment, as is shown in FIG. 14, a space $D_{18a}$ between distal end edges of a pair outside diameter side locking portions 18a, 18a and a space $D_{19a}$ between distal end edges of a pair of inside diameter side locking portions 19 are made to be equal to each other, the pairs of outside diameter side locking portions 18a and inside diameter side locking portions 19a being provided on both circumferential end edge portions of each pocket 7a in such a manner as to face each other. In contrast to this, a space $D_{20a}$ between central locking portions 20a, 20a is made to be wider than those spaces ($D_{18a} = D_{19a} < D_{20a}$). In the case of this embodiment, by controlling the spaces $D_{18a}$, $D_{19a}$, $D_{20a}$ of the distal end edges of the individual locking portions 18a to 20a, the displacement amount of each cylindrical roller 8 within each pocket 7a in the axial direction of the cage 2 (in a vertical direction in FIGS. 12 to 13, in a direction from a near to far side of a sheet of paper on which FIG. 14 is shown) is controlled.

This fact will be described by reference to FIGS. 12 to 13. Firstly, as is shown in FIGS. 12(a) and 13(a), an amount by which part of each cylindrical roller 8 projects axially (upwards in FIGS. 12 to 13) further than an outside diameter side flat plate portion 14 and an inside diameter side flat plate portion 15 in such a state that the cage 2 is displaced to one axial end side (a lower side in FIGS. 12 to 13) so as to bring the individual outside diameter side locking portions 18a, 18a and the individual inside diameter side locking portions 19a, 19a into engagement with a rolling surface of each cylindrical roller 8 is made to be a maximum projecting amount $\Delta_A$. On the other hand, an amount by which part of each cylindrical roller 8 projects axially further than a central flat plate portion 13 in such a state that the cage 2 is displaced to the other axial end side (an upper side in FIGS. 12 to 13) so as to bring the individual central locking portions 20a, 20a into engagement with the rolling surface of each cylindrical roller 8 is made to be a maximum projecting amount $\Delta_L$. In this case, the maximum projecting amount $\Delta_A$ from the outside diameter side and inside diameter side flat plate portions 14, 15 is made to be smaller than the maximum projecting amount $\Delta_L$ from the central flat plate portion 13 ($\Delta_A < \Delta_L$.)

According to this embodiment that is configured as has been described heretofore, even though as each cylindrical roller 8, the cylindrical roller is used in which the central flat surface 9s if formed at the central portion of both the axial end faces with a view to securing the load-carrying capacity of a thrust cylindrical roller bearing 1, the wear of the outside diameter side circumferential edge portion 22a of each pocket 7a is suppressed. Namely, since the space $D_{18a}$ between the distal end edges of the individual outside diameter side locking portions 18a, 18a and the space $D_{18a}$ between the distal end edges of the individual inside diameter side locking portions 19a, 19a are made to be relatively narrow (are made to be sufficiently small compared to the diameter D8 of each cylindrical roller 8), the outside diameter side and inside diameter side locking portions being brought into engagement with end portions of each cylindrical roller 8 with respect to the axial direction thereof (of each cylindrical roller 8 itself), respectively, the displacement amount of each cylindrical roller 8 with respect to the circumferential direction of the cage can be suppressed to a low level.

Namely, even though of each cylindrical roller 8 held in each pocket 7a, the end portion which lies on the inside diameter side of the cage 2 is attempted to be displaced to one circumferential direction while the other end portion which lies on the outside diameter side of the cage 2 is attempted to be displaced to the other circumferential direction, the displacement amount of each of the end portions is suppressed to an extremely low level. In addition, a deviation between the center axis direction of each cylindrical roller 8 and the diameter direction of the cage 2 is suppressed to a small level. In short, the skew angle of each cylindrical roller 8 can be suppressed to a small level based on the engagement of the distal end edges of the individual outside diameter side locking portions 18a, 18a and the distal end edges of the individual inside diameter side locking portions 19a, 19a with the rolling surface of each cylindrical roller 8. In addition, by maintaining a positional relationship between the outside diameter side end face 21 of each cylindrical roller 8 and the outside diameter side circumferential edge portion 22a of each pocket 7a in parallel or in substantially parallel, a risk that the outside diameter side end face 21 and the outside diameter side circumferential edge portion 22a are brought into offset collision is prevented, and even though such an offset collision occurs, the extent of offset collision is suppressed to a low level.

As a result of this, the extent of stress concentration occurring at a mutual rubbing portion between the outside diameter side end face 21 and the outside diameter side circumferential edge portion 22a is suppressed to a low level. Furthermore, the formation of an oil film for lubrication at the mutual rubbing portion is facilitated, thereby making it possible to prevent the occurrence of a metal contact at this mutual rubbing portion. As a result of this, the formation of a concavely recessed portion 23 as shown in FIG. 20 described above at the outside diameter side circumferential edge portion 19a by wear can be prevented.

On the other hand, the space $D_{20a}$ between the distal end edges of the central locking portions 20a, 20a, which are provided at a middle portion in a diameter direction of each pocket 7 which is not directly involved in suppressing the skew angle of each cylindrical roller 8 in such a manner as to be on the opposite side relative to the axial direction (of the cage 2) to the side where the individual outside diameter side locking portions 18a, 18a and the individual inside diameter side locking portions 19a, 19a are provided, is made to be relatively large (smaller by a small amount than the diameter $D_8$ of each cylindrical roller 8). Consequently, the installation work of each cylindrical roller 8 into each pocket 7a is implemented easily by expanding elastically the space $D_{20a}$ between the distal end edges of the individual central locking portions 20a, 20a.

Since force necessary to expand the space $D_{20a}$ between the distal end edges of the individual central locking portions 20a, 20a is small, surface pressure which is applied to the mutual rubbing portion between the rolling surface of each cylindrical roller 8 and the distal end edges of the individual central locking portions 20a, 20a during the installation work of each cylindrical roller 8 into each pocket 7a is limited. In addition, the hardness of a metallic material (bearing steel) of which the cylindrical roller 8 is made is sufficiently higher than the hardness of a metallic material (sheet steel) of which the cage 2 is made. Consequently, there is caused no risk that a harmful rubbing damage is formed on the rolling surface of each cylindrical roller 8 during the aforesaid installation work. In short, there occurs no case where the installation work of each cylindrical roller 8 into each pocket 7a is made difficult or the rolling surface of each cylindrical roller 8 gets easy to be damaged by narrowing the space $D_{18a}$ between the distal end edges of the individual outside diameter side locking portions 18a, 18a and the space $D_{19a}$ between the distal end edges of the individual inside diameter side locking portions 19a, 19a.

In addition, in the case of this embodiment, the wear of the outside diameter side circumferential edge portion 22a of the pocket 7a is prevented and the central portion of the outside diameter side end face 21 of the cylindrical roller is formed into the flat surface by suppressing the skewing of the cylindrical roller 8. Consequently, the effective length $L_8$ of each cylindrical roller 8 is increased, so as to secure the load-carrying capacity of the thrust cylindrical roller bearing 1.

Additionally, in the case of this embodiment, since the axial positioning of the cage 2 is realized by the engagement of the locking portions 18a to 20a with the rolling surface of each cylindrical roller 8, both the axial side surfaces of the cage 2 are caused in no case to rub against mating raceway surfaces. Because of this, the scraping of lubricating oil which adheres to the raceway surfaces by the cage 2 can be prevented, thereby making it possible to lubricate well a rolling contact portion between the raceway surfaces and the rolling surface of each cylindrical roller 8.

Note that in the case of this embodiment, both the maximum projecting amounts $\Delta_A$, $\Delta L$ are controlled in the following manner. Namely, the maximum projecting amount $\Delta_A$, shown in FIGS. 12(*a*) and 13(*a*), of each cylindrical roller 8 from the outside diameter side flat plate portion 14 and the inside diameter side flat plate portion 15 is made to be 80% or less ($\Delta_A \leq (0.8 \times \Delta L)$) and more preferably 70% or less ($\Delta_A \leq (0.7 \times \Delta L)$) of the maximum projecting amount $\Delta L$, shown in FIGS. 12(*b*) and 13(*b*), of each cylindrical roller 8 from the central flat plate portion 13. The reason these maximum projecting amounts $\Delta_A$, $\Delta L$ are controlled to fall within these ranges is as follows.

Figure 17:
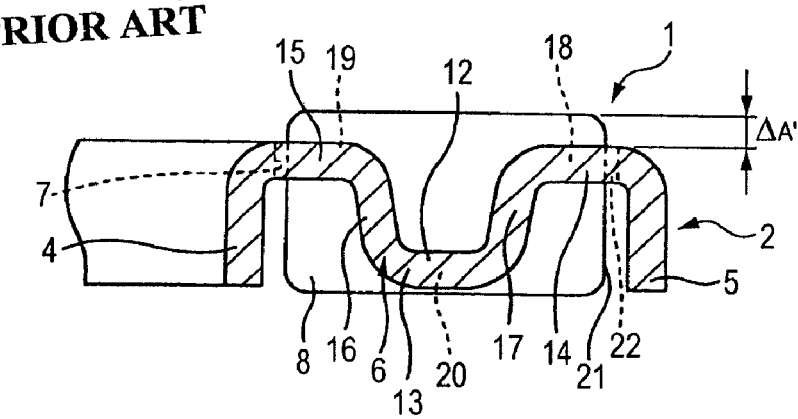
FIG. 17
Figure 17:
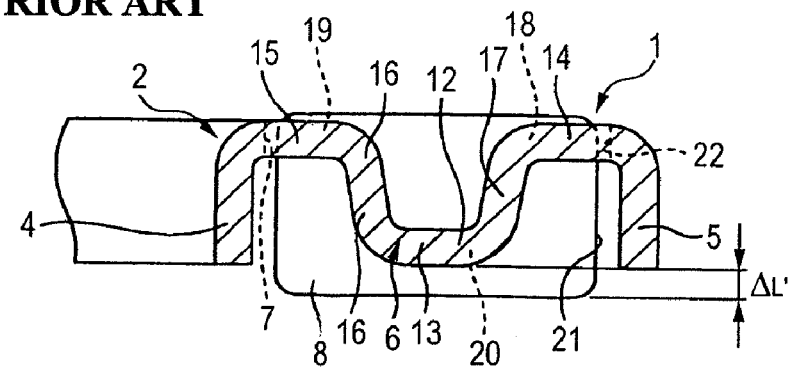
Figure 18:
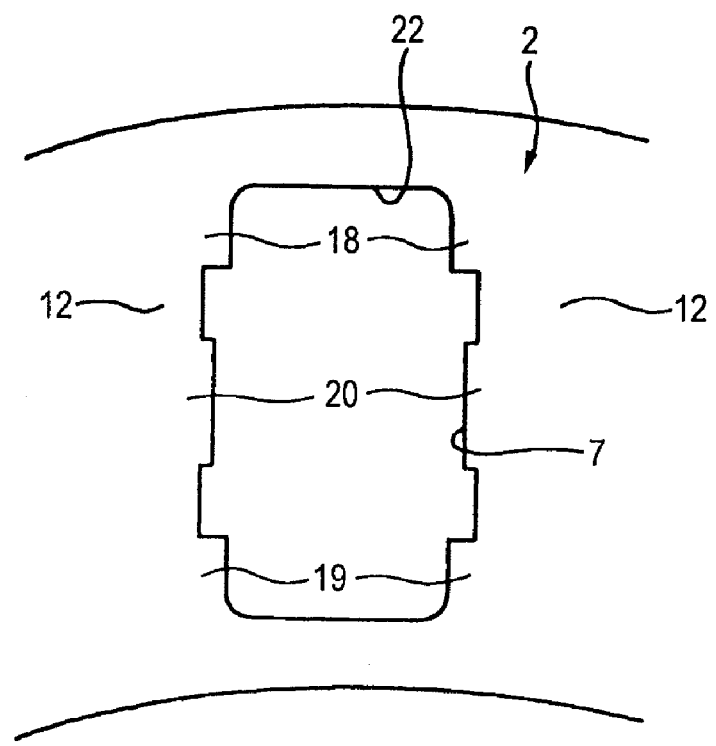
FIG. 18

As long as the maximum projecting amount $\Delta_A$, shown in FIGS. 12(*a*) and 13(*a*), from the outside diameter side flat plate portion 14 and the inside diameter side flat plate portion 15 is made to be smaller than the maximum projecting amount $\Delta L$, shown in FIGS. 12(*b*) and 13(*b*), from the central flat plate portion 13 ($\Delta_A < \Delta L$), as is shown in FIG. 17 described before, when compared to a case where both the maximum projecting amounts $\Delta_A'$, $\Delta L'$ are made to be equal to each other ($\Delta_A' = \Delta L'$) or the relationship with respect to magnitude is reversed ($\Delta_A > \Delta L'$), a function and advantage can be obtained that the skew angle is suppressed while facilitating the work of building each cylindrical roller 8 into each pocket 7*a*. However, in the event that the maximum projecting amount $\Delta_A$, shown in FIGS. 12(*a*) and 13(*a*), from the outside diameter side flat plate portion 14 and the inside diameter side flat plate portion 15 is made to be smaller than the maximum projecting amount $\Delta L$, shown in FIGS. 12(*b*) and 13(*b*), from the central flat plate portion 13 to such an extent that the former maximum projecting amount is smaller by a small amount than the latter maximum projecting amount, a function and advantage that can be obtained will be limited. In contrast to this, in the event that a difference so large as the extent that has been described above is provided, the aforesaid function and advantage can be obtained sufficiently.

Note that a maximum value of the difference (ratio) provided between both the maximum projecting amounts $\Delta_A$, $\Delta L$ is controlled such that the external surfaces of the outside diameter side flat plate portion 14 and the inside diameter side flat plate portion 15 are not caused to rub against the mating raceway surfaces. Namely, as is shown in FIGS. 12(*b*) and 13(*b*), the maximum projecting amount $\Delta_B$ is secured to such an extent that the projecting amount $\Delta_B$ of each cylindrical roller 8 from the outside diameter side flat plate portion 14 and the inside diameter side flat plate portion 15 clearly becomes a positive value in such a state that the maximum projecting amount $\Delta L$ from the central flat plate portion 13 is realized by displacing the cage to the other axial end side so as to bring the individual central locking portions 20*a*, 20*a* with the rolling surface of each cylindrical roller 8 as is shown in FIGS. 12(*b*) and 13(*b*). The clear positive value in this case means that the maximum projecting value $\Delta_B$ is a value by which a clearance can be secured between the surfaces of the outside diameter side flat plate portion 14 and the inside diameter side flat plate portion 15 and the mating raceway surfaces without causing both the surfaces to rub against each other (a degree of clearance is provided to such an extent that an oil film existing between both the surfaces is not made so thin as to produce a large shear resistance). The maximum projecting amount $\Delta_A$ from the outside diameter side flat plate portion 14 and the inside diameter side flat plate portion 15 is, of course, a value which is larger than the maximum projecting amount $\Delta_B$ ($\Delta_A > \Delta_B$).

On the other hand, the maximum projecting amount $\Delta L$ from the central flat plate portion 10 is controlled to fall within a range in which the space $D_{20a}$ between the distal end edges of the individual central locking portions 20*a*, 20*a* can be made to be less than the diameter $D_8$ of each cylindrical roller 8 ($D_{20a} < D_8$). When these facts are taken into consideration, in the case of a general thrust cylindrical roller bearing such as built in an automotive transmission or a compressor for an automotive air conditioner, a maximum value of the difference (ratio) between both the maximum projecting amounts $\Delta_A$, $\Delta L$ is 4 or less ($\Delta L/\Delta_A \leq 4$) and more preferably 3 or less ($\Delta L/\Delta_A \leq 3$).

In addition, with a pair of members 40, 41 (refer to FIG. 15) having raceway surfaces 40*a*, 41*a* which are brought into rolling contact with the rolling surface 10 of each of the cylindrical rollers 8 both made to revolve when in use, the central flat plate portion 13 of the cage 2 is preferably made to face the member 41 whose revolution speed when in use is faster. By adopting the configuration like this, more lubricating oil can be fed into the mutual rubbing portion between the outside diameter side end face 21 of the cylindrical roller 8 and the outside diameter side circumferential edge portion 22*a* of the cage 2, whereby the occurrence of metal contact at the rubbing portion can be made difficult.

Note that the invention is not such as to be limited to the individual embodiments that have been described heretofore and hence can be modified or improved properly. The individual embodiments that have been described heretofore can be combined together properly for application within a range which allows for such combinations.

Furthermore, the central flat surface 9 of each cylindrical roller 8 includes a surface having a recess of the order of 10 μm produced during production.

This patent application is such as to be based on the Japanese Patent Application (No. 2005-28703) filed on Feb. 4, 2005 and the Japanese Patent Application (No. 2005-59311) filed on Mar. 3, 2005, and the contents thereof are all incorporated herein by reference.

The invention claimed is:

1. A thrust cylindrical roller bearing comprising:
   a cage which is made into a circular ring shape as a whole and which comprises a plurality of pockets at a plurality of locations in a circumferential direction thereof, each pocket being disposed in a radial direction, and
   a plurality of cylindrical rollers which are rotatably retained within the pockets, respectively,
   the cage being made integrally by bending a metal plate and comprising:
      an inside diameter side rim portion which lies in an inner circumferential portion and which is formed into an annular shape which continues along a full circumference thereof,
      an outer diameter side rim portion which lies in an outer circumferential edge portion and which is formed into an annular shape which is concentric with the inside diameter side rim portion and which continues along the full circumference thereof,
      an intermediate plate portion which lies between the outside diameter side rim portion and the inside diameter side rim portion and which is bent with respect to a diameter direction in cross section,
      the pockets which are formed in the intermediate plate portion intermittently with respect to a circumferential direction and respectively in a radial direction, and a plurality of pillar portions which are provided circumferentially between the adjacent pockets, respectively, the intermediate plate portion comprising:
- a central flat plate portion which is formed at a portion which lies intermediate in a diameter direction and axially closer to one end,
- an outside diameter side flat plate portion which is formed at a portion which lies adjacent to a diameter inner side of the outside diameter side rim portion and axially closer to the other end,
- an inside diameter side flat plate portion which is formed at a portion which lies adjacent to a diameter outer side of the inside diameter side rim portion and axially closer to the other end,
- an inside diameter side connecting portion which connects an outer circumferential edge of the inside diameter side flat plate portion with an inner circumferential edge of the central flat plate portion, and
- an outside diameter side connecting portion which connects an outer circumferential edge of the central plate portion with an inner circumferential edge portion of the outside diameter side flat plate portion, an axial displacement of the cage to one axial end side being controlled by the engagement of each outside diameter side locking portion and each inside diameter side locking portion which are provided on a circumferential end edge of each of the pillar portions at portions of the outside diameter side flat plate portion and the inside diameter side flat plate portion with a rolling surface of each of the cylindrical rollers in such a state that part of each of the cylindrical rollers is left projecting axially further than distal end edges of both the inside diameter side and outside diameter side rim portions and the central flat plate portion, and an axial displace of the cage to the other axial end being controlled by the engagement of each central locking portion which is provided on the circumferential end edge of each of the pillar portions at a portion of the central flat plate portion with the rolling surface of each of the cylindrical rollers in such a state that part of each of the cylindrical rollers is left projecting axially further than the outside diameter of side flat plate portion and the inside diameter side flat plate portion, wherein each of the cylindrical rollers comprises, on at least an end face of both axial end faces thereof which lies on an outside diameter side of the cage,
- a central flat surface which expands in a direction which is at right angles to a revolution center axis of each of the cylindrical rollers, and
- a chamfered portion which connects an outer circumferential edge of the central flat surface with the rolling surface along a full circumference thereof, and in such a state that the cage is displaced to one axial end side so as to bring the outside diameter side locking portion and the inside diameter side locking portion into engagement with the rolling surface of the cylindrical roller, an amount by which part of the cylindrical roller projects from external surfaces of both the outside diameter side and inside diameter side flat plate portions which make up the cage is made to be less than a dimension of the chamfered portion with respect to the diameter direction of the cylindrical roller, and in such a state that the cage is displaced to the other axial end side so as to bring the central locking portion into engagement with the rolling surface of the cylindrical roller, a difference between an amount by which part of the cylindrical roller projects from the external surface of the outside diameter side flat plate portion which makes up the cage and the dimension of the chamfered portion relative to the diameter direction of the cylindrical roller is made to be smaller than a thickness of the metal plate.

2. The thrust cylindrical roller bearing according to claim 1, wherein
in such a state that the cage is displaced to one axial end side so as to bring the outside diameter side locking portion and the inside diameter side locking portion into engagement with the rolling surface of the cylindrical roller, the length of a surface over which the central flat surface of the cylindrical roller rubs against the outside diameter side circumferential edge portion of the pocket is made to be within 80% of a diameter of the cylindrical roller.

3. The thrust cylindrical roller bearing according to claim 1, wherein
of dimensions of the chamfered portion of the cylindrical roller, a dimension in the diameter direction of the cylindrical roller is made to be larger than an axial in the diameter direction thereof.

4. The thrust cylindrical roller bearing according to claim 1, wherein
a difference between an amount by which part of the cylindrical roller projects from the external surfaces of the outside diameter side and inside diameter side flat plate portions which make up the cage in such a state that the cage is displaced to one axial end side so as to bring the outside diameter side locking portion and the inside diameter side locking portion into engagement with the rolling surface of the cylindrical roller and an amount by which part of the cylindrical roller projects from the external surfaces of both the flat plate portions in such a state that the cage is displaced to the other axial end side so as to bring the central locking portion with the rolling surface of the cylindrical roller is made to be equal to or more than 50 μm.

5. The thrust cylindrical roller bearing according to claim 1, wherein
a pair of members having raceway surfaces which are brought into rolling contact with the rolling surface of the cylindrical roller both revolve when in use, and
the central flat plate portion of the cage is made to face the member whose revolution speed when in use is faster.

6. The thrust cylindrical roller bearing according to claim 1, wherein
a shear surface is formed on the outside diameter side circumferential edge portion of the pocket at a portion which lies closer to the revolution center axis of the cylindrical roller, and
the central flat surface of the cylindrical roller is brought into contact with only the shear surface while the bearing is in revolution.

7. A thrust cylindrical roller bearing comprising:
a cage which is made into a circular ring shape as a whole and comprises a plurality of pockets at a plurality of locations in a circumferential direction thereof, each pocket being disposed in a radial direction, and
a plurality of cylindrical rollers which are rotatably retained within the pockets, respectively, the cage being made integrally by bending a metal plate and comprising:

an inside diameter side rim portion which lies in an inner circumferential portion and which is formed into an annular shape which continues along a full circumference thereof, an outer diameter side rim portion which lies in an outer circumferential edge portion and which is formed into an annular shape which is concentric with the inside diameter side rim portion and which continues along the full circumference thereof, an intermediate plate portion which lies between the outside diameter side rim portion and the inside diameter side rim portion and which is bent with respect to a diameter direction in cross section, the pockets which are formed in the intermediate plate portion intermittently with respect to a circumferential direction and respectively in a radial direction, and a plurality of pillar portions which are provided circumferentially between the adjacent pockets, respectively, the intermediate plate portion comprising:

a central flat plate portion which is formed at a portion which lies intermediate in a diameter direction and axially closer to one end, an outside diameter side flat plate portion which is formed at a portion which lies adjacent to a diameter inner side of the outside diameter side rim portion and axially closer to the other end, an inside diameter side flat plate portion which is formed at a portion which lies adjacent to a diameter outer side of the inside diameter side rim portion and axially closer to the other end, an inside diameter side connecting portion which connects an outer circumferential edge of the inside diameter side flat plate portion with an inner circumferential edge of the central flat plate portion, and an outside diameter side connecting portion which connects an outer circumferential edge of the central plate portion with an inner circumferential edge portion of the outside diameter side flat plate portion, an axial displacement of the cage to one axial end side being controlled by the engagement of each outside diameter side locking portion and each inside diameter side locking portion which are provided on a circumferential end edge of each of the pillar portions at portions of the outside diameter side flat plate portion and the inside diameter side flat plate portion with a rolling surface of each of the cylindrical rollers in such a state that part of each of the cylindrical rollers is left projecting axially further than distal end edges of both the inside diameter side and outside diameter side rim portions and the central flat plate portion, and an axial displace of the cage to the other axial end being controlled by the engagement of each central locking portion which is provided on the circumferential end edge of each of the pillar portions at a portion of the central flat plate portion with the rolling surface of each of the cylindrical rollers in such a state that part of each of the cylindrical rollers is left projecting axially further than the outside diameter of side flat plate portion and the inside diameter side flat plate portion, wherein an amount by which part of the cylindrical roller projects axially further than the outside diameter side flat plate portion and the inside diameter side flat plate portion in such a state that the cage is displaced to one axial end side so as to bring the outside diameter side locking portion and the inside diameter side locking portion into engagement with the rolling surface of the cylindrical roller is made smaller than an amount by which part of the cylindrical roller projects axially further than the central flat plate portion in such a state that the cage is displaced to the other axial end side so as to bring the central locking portion with the rolling surface of the cylindrical roller.

8. The thrust cylindrical roller bearing according to claim 7, wherein an amount by which part of the cylindrical roller projects axially further than the outside diameter side flat plate portion and the inside diameter side flat plate portion in such a state that the cage is displaced to one axial end side so as to bring the outside diameter side locking portion and the inside diameter side locking portion into engagement with the rolling surface of the cylindrical roller is made to be 80% or less of an amount by which part of the cylindrical roller projects axially further than the central flat plate portion in such a state that the cage is displaced to the other axial end side so as to bring the central locking portion into engagement with the rolling surface of the cylindrical roller.

9. The thrust cylindrical roller bearing according to claim 7, wherein a central portion of each of end faces of the cylindrical roller is made to constitute a central flat surface which lies in a direction which is at right angles to a center axis of the cylindrical roller.

10. The thrust cylindrical roller bearing according to claim 7, wherein a pair of members having raceway surfaces which are brought into rolling contact with the rolling surface of the cylindrical roller both revolve when in use, and the central flat plate portion of the cage is made to face the member whose revolution speed when in use is faster.

* * * * *